(12) United States Patent
Pillay et al.

(10) Patent No.: US 12,289,220 B1
(45) Date of Patent: Apr. 29, 2025

(54) LOGICAL PATH DOWN SCOPE ANALYSIS

(71) Applicant: Juniper Networks, Inc., Sunnyvale, CA (US)

(72) Inventors: Amit Pillay, Milpitas, CA (US); Xiaoying Wu, Sunnyvale, CA (US); Patrick Timmons, Newton, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 6 days.

(21) Appl. No.: 18/063,591

(22) Filed: Dec. 8, 2022

Related U.S. Application Data

(60) Provisional application No. 63/366,822, filed on Jun. 22, 2022.

(51) Int. Cl.
  *H04L 43/062* (2022.01)
  *H04L 41/0631* (2022.01)

(52) U.S. Cl.
  CPC ........ *H04L 43/062* (2013.01); *H04L 41/0631* (2013.01)

(58) Field of Classification Search
  CPC .................. H04L 43/062; H04L 41/0631
  See application file for complete search history.

(56) References Cited

U.S. PATENT DOCUMENTS

| | | |
|---|---|---|
| 5,559,955 A | 9/1996 | Dev et al. |
| 6,604,208 B1 | 8/2003 | Gosselin et al. |
| 6,728,205 B1 | 4/2004 | Finn et al. |
| 8,661,295 B1 | 2/2014 | Khanna et al. |
| 9,369,550 B2 | 6/2016 | Sung et al. |

(Continued)

FOREIGN PATENT DOCUMENTS

| | | |
|---|---|---|
| CN | 112104495 A | 12/2020 |
| EP | 3211831 A1 | 8/2017 |

(Continued)

OTHER PUBLICATIONS

"Connection Monitoring for WAN Failover", cisco Meraki [online]. Retrieved from the Internet: <https://documentation.meraki.com/MX/Firewall_and_Traffic_Shaping/Connection_Monitoring_for_WAN_Failover> Feb. 19, 2021, 3 pp.

(Continued)

*Primary Examiner* — William G Trost, IV
*Assistant Examiner* — Abdelbasst Talioua
(74) *Attorney, Agent, or Firm* — Shumaker & Sieffert, P.A.

(57) ABSTRACT

A network management system (NMS) generates a hierarchical attribution graph representing different scopes at different hierarchical levels of a wide area network (WAN); obtains logical path down data indicative of operational behavior including failure events associated with logical paths of network devices over the WAN; obtains total path data indicative of a historical number of active logical paths between the network devices; and determines a scope of a logical path down issue by, for a time period of the logical path down issue, determining a score for each scope of the different scopes based on the logical path down data aggregated across the respective scope and the total path data, and determining the scope of the logical path down issue as a particular scope of the different scopes having a highest score. The NMS may identify the particular scope as a root cause of the logical path down issue.

19 Claims, 9 Drawing Sheets

(56) References Cited

U.S. PATENT DOCUMENTS

| | | | |
|---|---|---|---|
| 9,413,597 B2* | 8/2016 | Bishop | H04L 41/0618 |
| 9,729,439 B2 | 8/2017 | MeLampy et al. | |
| 9,729,682 B2 | 8/2017 | Kumar et al. | |
| 9,762,485 B2 | 9/2017 | Kaplan et al. | |
| 9,769,044 B1 | 9/2017 | Cirkovic et al. | |
| 9,832,082 B2 | 11/2017 | Dade et al. | |
| 9,871,748 B2 | 1/2018 | Gosselin et al. | |
| 9,985,883 B2 | 5/2018 | MeLampy et al. | |
| 10,200,264 B2 | 2/2019 | Menon et al. | |
| 10,277,506 B2 | 4/2019 | Timmons et al. | |
| 10,432,522 B2 | 10/2019 | Kaplan et al. | |
| 10,756,983 B2 | 8/2020 | Ratkovic et al. | |
| 10,771,434 B1* | 9/2020 | Srinath | H04L 63/0209 |
| 10,862,742 B2 | 12/2020 | Singh | |
| 10,958,537 B2 | 3/2021 | Safavi | |
| 10,958,585 B2 | 3/2021 | Safavi | |
| 10,985,969 B2 | 4/2021 | Safavi et al. | |
| 10,992,543 B1 | 4/2021 | Rachamadugu et al. | |
| 10,999,182 B2 | 5/2021 | Kaplan et al. | |
| 11,075,824 B2 | 7/2021 | McCulley et al. | |
| 11,153,202 B2 | 10/2021 | Kaplan et al. | |
| 11,165,863 B1 | 11/2021 | Timmons et al. | |
| 11,206,185 B2* | 12/2021 | Sarood | H04L 67/34 |
| 11,329,912 B2 | 5/2022 | Kaplan et al. | |
| 11,451,464 B2 | 9/2022 | Kaplan et al. | |
| 11,838,172 B2 | 12/2023 | Cheng et al. | |
| 2001/0013107 A1 | 8/2001 | Lewis | |
| 2006/0095815 A1 | 5/2006 | Noy et al. | |
| 2008/0201462 A1 | 8/2008 | Liss et al. | |
| 2010/0063871 A1* | 3/2010 | Merrifield, Jr. | G06Q 10/06375 |
| | | | 705/7.37 |
| 2010/0172251 A1* | 7/2010 | Adam | H04W 4/02 |
| | | | 370/252 |
| 2011/0274119 A1 | 11/2011 | Golovchenko et al. | |
| 2013/0051248 A1* | 2/2013 | Pei | H04L 41/0618 |
| | | | 370/245 |
| 2014/0129876 A1 | 5/2014 | Addepalli et al. | |
| 2014/0379895 A1* | 12/2014 | Jain | H04L 41/0654 |
| | | | 709/224 |
| 2016/0112350 A1* | 4/2016 | Morrison | H04L 49/557 |
| | | | 370/218 |
| 2018/0191563 A1 | 7/2018 | Farmanbar et al. | |
| 2018/0308001 A1 | 10/2018 | Doddala et al. | |
| 2020/0136890 A1 | 4/2020 | To et al. | |
| 2020/0213236 A1 | 7/2020 | Safavi | |
| 2020/0259746 A1 | 8/2020 | Thubert et al. | |
| 2020/0313979 A1 | 10/2020 | Kumaran et al. | |
| 2020/0351149 A1 | 11/2020 | Yan et al. | |
| 2020/0366589 A1 | 11/2020 | Kaplan et al. | |
| 2020/0366590 A1 | 11/2020 | Kaplan et al. | |
| 2020/0366598 A1 | 11/2020 | Kaplan et al. | |
| 2020/0366599 A1 | 11/2020 | Kaplan et al. | |
| 2020/0374182 A1* | 11/2020 | Kolodner | H04L 41/5009 |
| 2020/0403855 A1* | 12/2020 | Sarood | H04L 41/082 |
| 2020/0403890 A1 | 12/2020 | McCulley et al. | |
| 2021/0097411 A1 | 4/2021 | Guntur | |
| 2022/0116334 A1 | 4/2022 | Zhu et al. | |
| 2022/0271832 A1 | 8/2022 | Choquette | |
| 2022/0337495 A1 | 10/2022 | Safavi | |
| 2022/0393981 A1* | 12/2022 | Solanki | H04L 47/805 |
| 2023/0011452 A1* | 1/2023 | Barber | G06F 16/24558 |
| 2023/0118718 A1* | 4/2023 | Solanki | H04L 12/4633 |
| | | | 726/12 |
| 2023/0231785 A1 | 7/2023 | Kumar et al. | |

FOREIGN PATENT DOCUMENTS

| | | |
|---|---|---|
| EP | 3389220 A1 | 10/2018 |
| EP | 3700133 A1 | 8/2020 |

OTHER PUBLICATIONS

"Dual ISP failover with RPM ip-monitoring", RtoDto.net [online]. Retrieved from the Internet: <https://rtodto.net/dual-isp-failover-with-rpm-ip-monitoring/> Nov. 10, 2014, 17 pp.

"Technical Note: Detecting a link failure using Dead Gateway Detection (ping server) to ensure a link fail over", Fortinet Forum [online]. Retrieved from the Internet: <https://community.fortinet.com/t5/FortiGate/Technical-Note-Detecting-a-link-failure-using-Dead-Gateway/ta-p/190912?externalId=FD30626> edited on Dec. 16, 2021, 5 pp.

"Troubleshoot Citrix SD-WAN Issues Using ARP Table", Citrix Support Knowledge Center [online]. Retrieved from the Internet: <https://support.citrix.com/article/CTX236828> Aug. 2, 2018, 2 pp.

"WAN Connection Detection", Dray Tek [online]. Retrieved from the Internet: <https://www.draytek.co.uk/support/guides/kb-connection-detection> Jul. 1, 2016, 5 pp.

"Your ISP's DHCP does not function properly. DHCP Failure. ASUS RT-AC86U @Comcastche", Xfinity Community Forum [online]. Retrieved from the Internet: <https://forums.xfinity.com/conversations/your-home-network/your-isps-dhcp-does-not-function-properly-dhcp-failure-asus-rtac86u-comcastche/602daf9ec5375f08cd11d6a4> Jul. 26, 2020, 3 pp.

U.S. Appl. No. 16/835,757 entitled "Network System Fault Resolution Via a Machine Learning Model" Juniper Networks, Inc. (inventor: Wang et al.) filed Mar. 30, 2020.

U.S. Appl. No. 17/446,601, filed Aug. 31, 2022, by Cheng et al.

U.S. Appl. No. 17/554,928, filed Dec. 17, 2021, Wang et al.

* cited by examiner

LOGICAL PATH DOWN SCOPE ANALYSIS

This application claims the benefit of U.S. Provisional Patent Application No. 63/366,822, filed 22 Jun. 2022, the entire contents of which is incorporated herein by reference.

TECHNICAL FIELD

This disclosure generally relates to computer networks and, more specifically, monitoring and/or managing network performance in computer networks.

BACKGROUND

A computer network is a collection of interconnected computing devices that can exchange data and share resources. Example computing devices include routers, switches, and other layer two (L2) network devices that operate within layer two of the Open Systems Interconnection (OSI) reference model, i.e., the data link layer, and layer three (L3) network devices that operate within layer three of the OSI reference model, i.e., the network layer. Network devices within computer networks often include a control unit that provides control plane functionality for the network device and forwarding components for routing or switching data units.

SUMMARY

In general, this disclosure describes techniques for performing a logical path down scope analysis to identify root causes of logical path failures in a wide area network (WAN) and, based on the identified root causes, invoking an action (e.g., providing a notification to an administrator to perform a remedial action or automatically performing the remedial action). The logical path down scope analysis may leverage a logical path down Service Level Expectation (SLE) metric for monitoring network performance and managing network faults that may impact user experiences in an enterprise network based on path data received from one or more network devices operating as network gateways in the WAN. The logical path down scope analysis includes determining a scope of a logical path down event from among the potential scopes of (from top-down): provider, gateway (hub/spoke), gateway interface (hub/spoke interface), and A cloud-based network management system (NMS) receives the path data from the network devices. The path data is indicative of one or more aspects of network performance as monitored on each logical path between network devices over the WAN. The NMS determines one or more WAN link health assessments, including the logical path down SLE, based on the path data received from the network devices. The logical path down SLE data defines one or more failure events associated with the logical paths. The NMS performs the logical path down scope analysis by aggregating the logical path down SLE data across each scope of the different scopes, obtaining total path data indicative of a historical number of active logical paths between the network devices, and, for a particular logical path down issue, determining a score for each scope of the different scopes based on the logical path down SLE data aggregated across the particular scope and the total path data. The NMS determines a scope of the particular logical path down issue as the particular scope of the different scopes having a highest score. Based on the determined scope of the particular logical path down issue, the NMS identifies a root cause of the particular logical path down issue and automatically recommends or invokes one or more remedial actions to address the particular logical path down issue.

In one example, this disclosure is directed to a NMS comprising one or more processors and a memory comprising instructions that when executed by the one or more processors cause the one or more processors to: generate a hierarchical attribution graph, wherein the hierarchical attribution graph comprises attributes representing different scopes at different hierarchical levels of a WAN; obtain logical path down data based on path data reported by a plurality of network devices operating as network gateways, wherein the logical path down data is indicative of operational behavior including one or more failure events associated with one or more logical paths on a physical interface of each network device of the plurality of network devices over the WAN; obtain total path data indicative of a historical number of active logical paths between one or more of the network devices; and determine a scope of a logical path down issue, To determine the scope of the logical path down issue, the one or more processors of the NMS are configured to: for a time period of the logical path down issue, determine a score for each scope of the different scopes based on the logical path down data aggregated across the respective scope and the total path data, and determine the scope of the logical path down issue as a particular scope of the different scopes having a highest score.

In another example, this disclosure is directed to a method comprising: generating, by a NMS, a hierarchical attribution graph, wherein the hierarchical attribution graph comprises attributes representing different scopes at different hierarchical levels of a WAN; obtaining, by the NMS, logical path down data based on path data reported by a plurality of network devices operating as network gateways, wherein the logical path down data is indicative of operational behavior including one or more failure events associated with one or more logical paths on a physical interface of each network device of the plurality of network devices over the WAN; obtaining, by the NMS, total path data indicative of a historical number of active logical paths between one or more of the network devices; and determining, by the NMS, a scope of a logical path down issue, wherein determining the scope of the logical path down issue comprises: for a time period of the logical path down issue, determining a score for each scope of the different scopes based on the logical path down data aggregated across the respective scope and the total path data, and determining the scope of the logical path down issue as a particular scope of the different scopes having a highest score.

In a further example, this disclosure is directed to a computer-readable storage medium comprising instructions that, when executed, cause one or more processors to: generate a hierarchical attribution graph, wherein the hierarchical attribution graph comprises attributes representing different scopes at different hierarchical levels of a WAN; obtain logical path down data based on path data reported by a plurality of network devices operating as network gateways, wherein the logical path down data is indicative of operational behavior including one or more failure events associated with one or more logical paths on a physical interface of each network device of the plurality of network devices over the WAN; obtain total path data indicative of a historical number of active logical paths between one or more of the network devices; and determine a scope of a logical path down issue, wherein to determine the scope of the logical path down issue, the instructions cause the one or more processors to: for a time period of the logical path down issue, determine a score for each scope of the different scopes based on the logical path down data aggregated across the respective scope and the total path data, and determine the scope of the logical path down issue as a particular scope of the different scopes having a highest score.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1A:
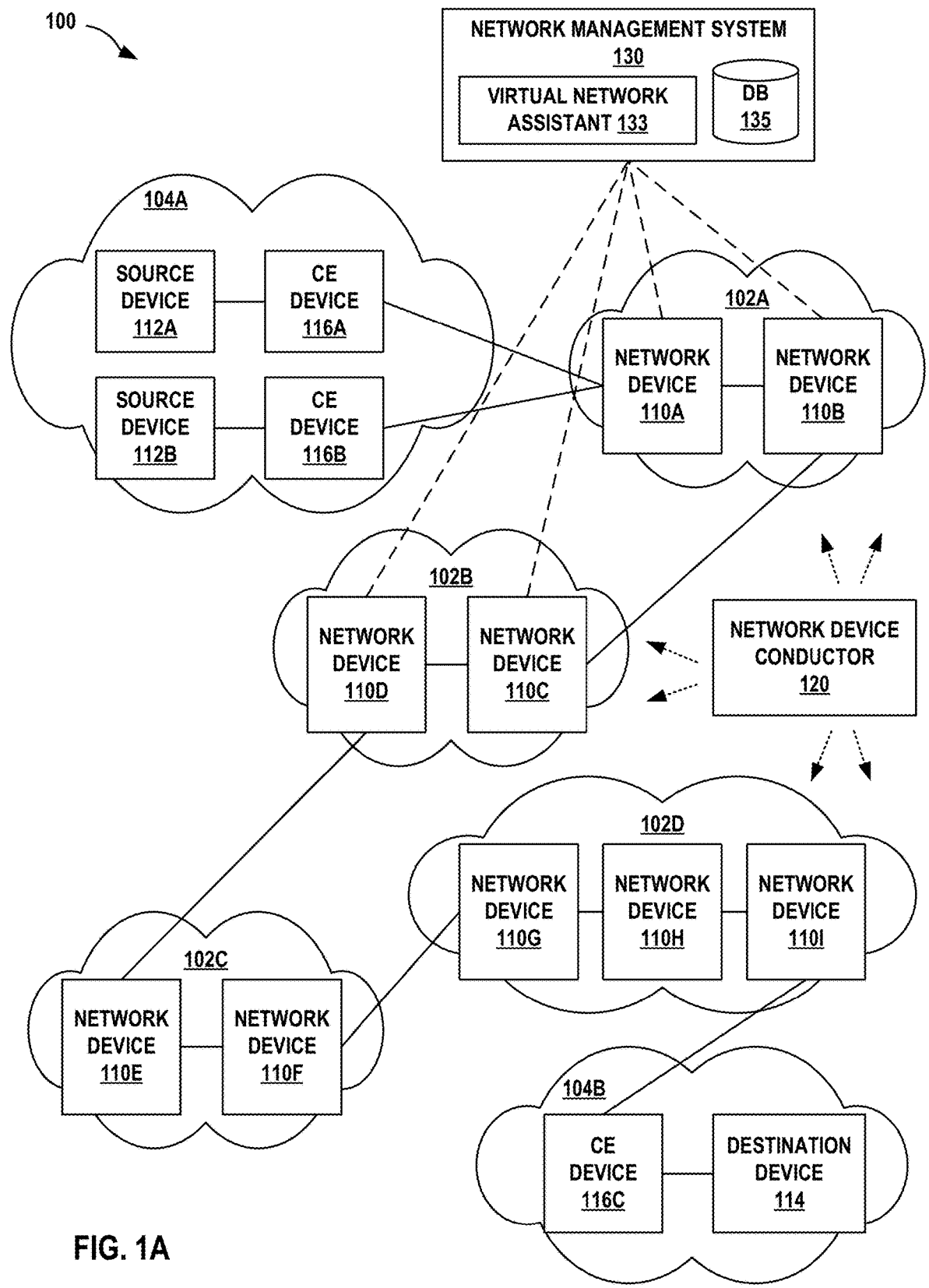
FIGS. 1A-1C are block diagrams illustrating example network systems including a network management system (NMS), in accordance with one or more techniques of the disclosure.
Figure 1B:
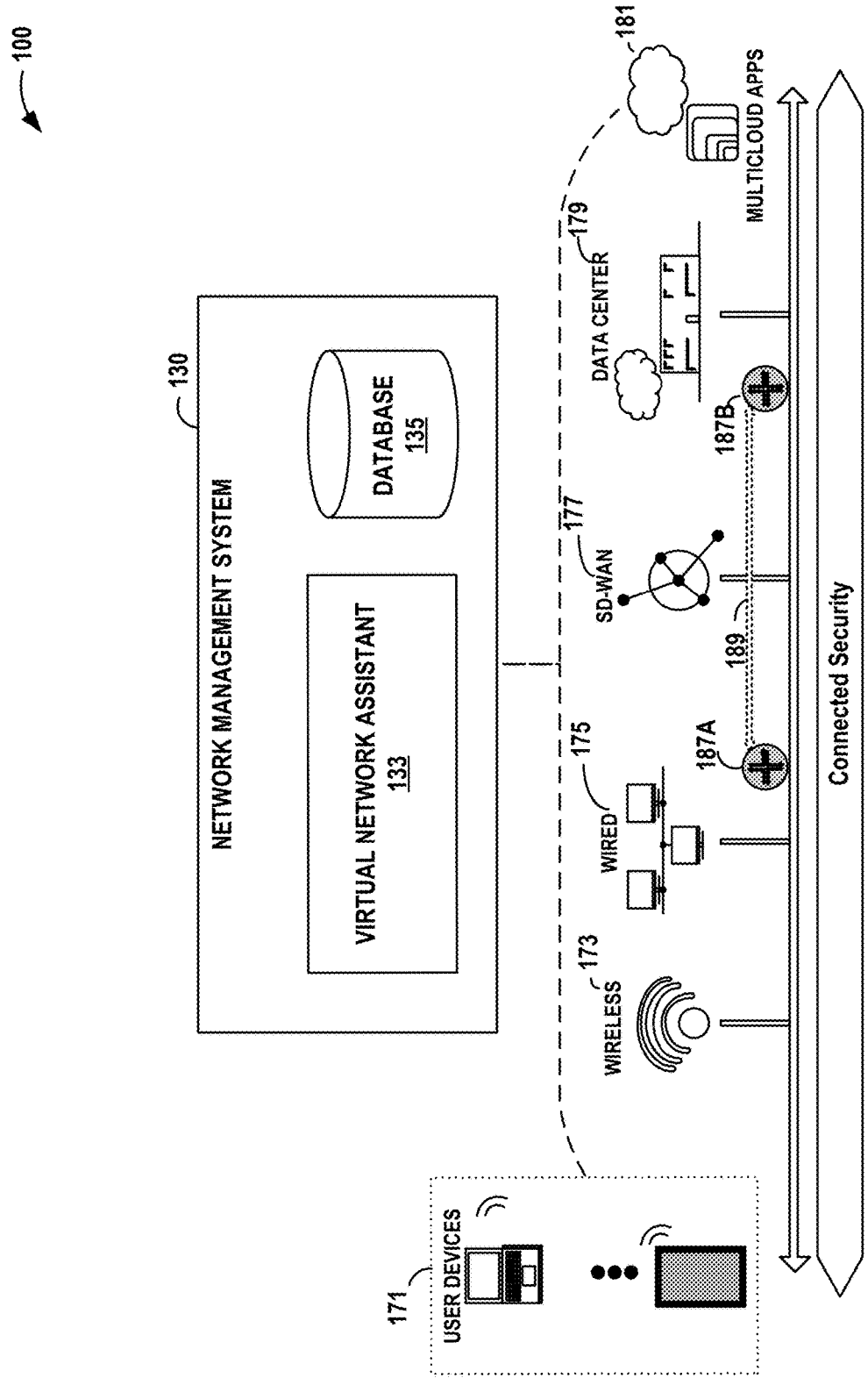
Figure 1C:
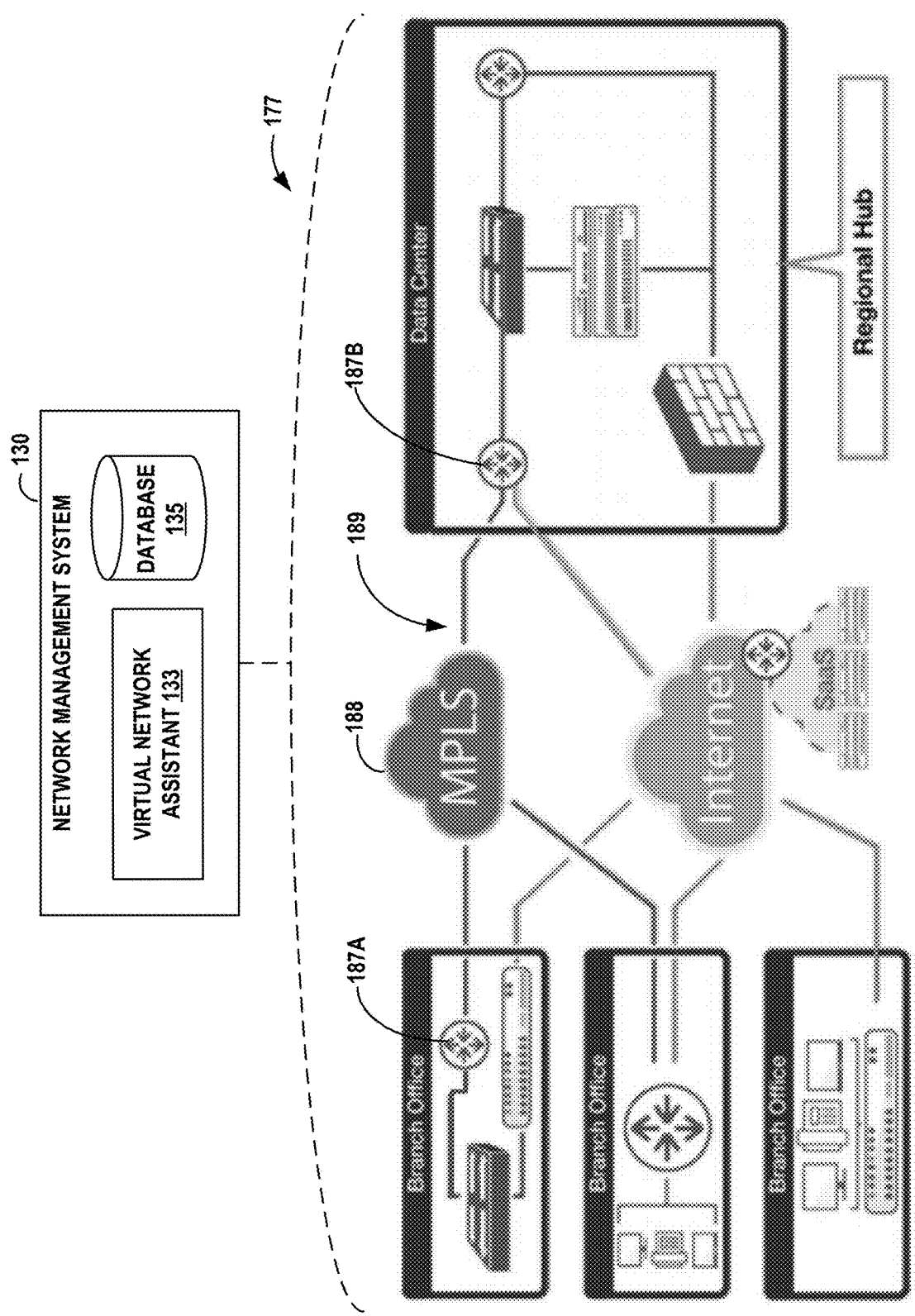

FIGS. 1A-1C are block diagrams illustrating example network systems 100 including a network management system (NMS) 130, in accordance with one or more techniques of the disclosure.

FIG. 1A is a block diagram illustrating example network system 100 in accordance with the techniques of the disclosure. In the example of FIG. 1A, network system 100 includes networks 102A-102D (collectively, "networks 102") configured to provide Wide Area Network (WAN) connectivity to different customer networks 104A-104B ("customer networks 104") of an enterprise network. In some examples, networks 102 are service provider networks. Although in the example of FIG. 1A, network system 100 is illustrated as including multiple interconnected networks 102, in other examples network system 100 may alternatively include a single network that provides connectivity between customer networks 104.

Network devices 110A-110I (collectively, "network devices 110") of networks 102 provide source devices 112A and 112B (collectively, "source devices 112") and destination device 114 associated with customer networks 104 with access to networks 102 via customer edge devices 116A-116C (collectively, "CE devices 116"). Communication links between network devices 110 may be Ethernet, ATM, or any other suitable network connections.

Network device conductor 120 is a centralized management and policy engine that provides orchestration, administration, and zero-touch provisioning for distributed network devices 110 while maintaining a network-wide, multi-tenant service, and policy data model. Network device conductor 120 may be considered an orchestrator. In some examples, network device conductor 120 also provides monitoring and analytics for network devices 110, while in other examples monitoring and analytics for network devices 110 and/or CE devices 116 are provided by NMS 130 only. In some examples, NMS 130 provides WAN Assurance services to networks 102 and provides Wireless Assurance and/or Wired Assurance services to customer networks 104. In the example of FIG. 1A, NMS 130 includes a virtual network assistant 133 which may provide machine-learning based analytics of data collected by NMS 130 from network devices 110 of networks 102 for the WAN Assurance services, and may provide machine-learning based analytics of data collected by NMS 130 from CE devices 116 or other customer equipment within customer networks 104 for the Wireless Assurance and/or Wired Assurance services.

CE devices 116 and network devices 110 are discussed herein for purposes of example as being routers. However, techniques of the disclosure may be implemented using any network device, such as switches, routers, gateways, or other suitable network devices that may send and receive network traffic. Customer networks 104 may be networks for geographically separated sites of the enterprise network, for example. Each of customer networks 104 may include additional customer equipment, such as, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices not depicted in FIG. 1A. The configuration of network system 100 illustrated in FIG. 1A is merely an example. For example, network system 100 may include any number of customer networks 104. Nonetheless, for ease of description, only customer networks 104A-104B are illustrated in FIG. 1A.

Networks 102 represent one or more publicly accessible computer networks that are owned and operated by one or more service providers. A service provider is usually a large telecommunications entity or corporation. Each of networks 102 is usually a large Layer-Three (L3) computer network, where reference to a layer followed by a number refers to a corresponding layer in the Open Systems Interconnection (OSI) model. Each network 102 is an L3 network in the sense that it natively supports L3 operations as described in the OSI model. Common L3 operations include those performed in accordance with L3 protocols, such as the Internet Protocol (IP). L3 is also known as a "network layer" in the OSI model and the term L3 may be used interchangeably with the phrase "network layer" throughout this disclosure.

Although not illustrated, each network 102 may be coupled to one or more networks administered by other providers, and may thus form part of a large-scale public network infrastructure, e.g., the Internet. Consequently, customer networks 104 may be viewed as edge networks of the Internet. Each network 102 may provide computing devices within customer networks 104, such as source devices 112 and destination devices 114, with access to the Internet, and may allow the computing devices within customer networks 104 to communicate with each other.

Although additional network devices are not shown for ease of explanation, network system 100 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Moreover, although the elements of network system 100 are illustrated as being directly coupled, one or more additional network elements may be included along any of the communication links between network devices 110, such that the network elements of computer network system 100 are not directly coupled.

Each network 102 typically provides a number of residential and business services for customer networks 104, including residential and business class data services (which are often referred to as "Internet services" in that these data services permit access to the collection of publicly accessible networks referred to as the Internet), residential and business class telephone and/or voice services, and residential and business class television services.

In some examples, network devices 110 comprise packet-based routers that employ a packet- or flow-based routing scheme to forward packets according to defined network paths established by a centralized controller, such as a Software-Defined Networking (SDN) controller, that performs path selection and traffic engineering. A given one of network devices 110, e.g., network device 110A, that comprises a packet-based router operating as a network gateway for customer network 104A may establish multiple tunnels, e.g., Internet Protocol security (IPsec) tunnels, over the WAN with one or more other packet-based routers, e.g., network device 110I, operating as network gateways for other sites of the enterprise network, e.g., customer network 104B. As described herein, each of the packet-based routers may collect data at a tunnel level, and the tunnel data may be retrieved by NMS 130 via an API or an open configuration protocol or the tunnel data may be reported to NMS 130 by a software agent or other module running on the packet-based router.

In other examples, network devices 110 comprise session-based routers that employ a stateful, session-based routing scheme that enables each network device 110 to independently perform path selection and traffic engineering. The use of session-based routing may enable network devices 110 to eschew the use of a centralized controller, such as an SDN controller, to perform path selection and traffic engineering. In this way, network devices 110 may be more efficient and scalable for large networks where the use of an SDN controller would be infeasible. Furthermore, the use of session-based routing may enable network devices 110 to eschew the use of tunnels, thereby saving considerable network resources by obviating the need to perform encapsulation and decapsulation at tunnel endpoints. In some examples, network devices 110 implement session-based routing as Secure Vector Routing (SVR), provided by Juniper Networks, Inc. A given one of network devices 110, e.g., network device 110A, that comprises a session-based router operating as a network gateway for customer network 104A may establish multiple peer paths over the WAN with one or more other session-based routers, e.g., network device 110I, operating as network gateways for other sites of the enterprise network, e.g., customer network 104B. As described herein, each of the session-based routers may include a software agent imbedded in the session-based router configured to report path data collected at a peer path level to NMS 130.

A network session (also referred to herein as a "session") includes a forward packet flow originating from a first device and destinated for a second device and/or a reverse packet flow originating from the second device and destined for the first device. The session may be bidirectional in that the session may include packets travelling in both directions (e.g., a forward packet flow and a reverse packet flow) between the first and second devices.

When, e.g., network device 110A receives a packet for a flow originating from source device 112A and destined for destination device 114, network device 110A determines whether the packet belongs to a new session (e.g., is the "first" packet or "lead" packet of the session). In some examples, network device 110A determines whether a source address, source port, destination address, destination port, and protocol of the first packet matches an entry in a session table. If no such entry exists, network device 110A determines that the packet belongs to a new session and creates an entry in the session table. Furthermore, if the packet belongs to a new session, network device 110A generates a session identifier for the session. The session identifier may comprise, e.g., a source address and source port of source device 112A, a destination address and destination port of destination device 114, and a protocol used by the first packet. Network device 110A may use the session identifier to identify subsequent packets as belonging to the session.

In some examples, network devices 110 perform stateful routing for a session. This means that network devices 110 forward each packet of the forward packet flow of a session sequentially and along the same forward network path. As described herein, the "same" forward path means the same network devices 110 that form a segment or at least a portion between a device originating the packet and a device to which the packet is destined (and not necessarily the entire network path between the device originating the packet and the device to which the packet is destined). Further, network devices 110 forward each packet of the return flow of the session sequentially and along the same return network path. The forward network path for the forward packet flow and the return network path of the return flow may be the same path, or different paths. By ensuring that each packet of a flow is forwarded sequentially and along the same path, network devices 110 maintain the state of the entire flow at each network device 110, thereby enabling the use of stateful packet services, such as Deep Packet Inspection (DPI).

In the example of FIG. 1A, a stateful routing session may be established from ingress network device 110A through intermediate network devices 110B-110H to egress network device 110I. In this example, network device 110A determines that the first packet is an unmodified packet and the first packet of a new session. Network device 110A modifies the first packet to include metadata specifying the session identifier (e.g., the original source address, source port, destination address, and destination port). Network device 110A replaces the header of the modified first packet to specify a source address that is an address of network device 110A, a source port that is a port via which network device 110A forwards the modified first packet toward destination device 114, a destination address that is an address of the next hop to which network device 110A forwards the first packet (e.g., an address of network device 110B), and a destination port that is a port of the next hop to which network device 110A forwards the first packet (e.g., a port of network device 110B).

Network device 110A may further identify a network service associated with the session. For example, network device 110A may compare one or more of a source address, source port, destination address, or destination port for the session to a table of service address and port information to identify a service associated with the session. Examples of network services include Hypertext Transfer Protocol (HTTP), a firewall service, a proxy service, packet monitoring or metrics services, etc. For example, if the source port and/or destination port for the session is 80, network device may determine that the session is associated with HTTP. In other examples, network device 110A may determine that one or more of a source address, source port, destination address, or destination port for the session belong to a block of address or ports indicative that a particular service is associated with the session.

In some examples, network device 110A uses the determined network service for the session to select a forward path for forwarding the first packet and each subsequent packet toward destination device 114. In this fashion, network device 110A may perform service-specific path selection to select a network path that best suits the requirements of the service. In contrast to a network topology that uses an SDN controller to perform path selection, each network device 110 performs path selection. Further, the use of session-based routing enables each network device 110 to make routing decisions at the service- or application-level, in contrast to conventional network devices that are only able to make routing decisions at the flow level.

Network device 110A forwards the modified first packet to network device 110B. Additionally, network device 110A stores the session identifier for the session such that, upon receiving subsequent packets for the session, network device 110A may identify subsequent packets as belonging to the same session and forward the subsequent packets along the same path as the first packet.

Intermediate network device 110B receives the modified first packet and determines whether the modified first packet includes a portion of metadata specifying the session identifier. In response to determining that the modified first packet includes metadata specifying the session identifier, intermediate network device 110B determines that network device 110B is not an ingress device such that network device 110B does not attach metadata specifying the session identifier.

As described above with respect to network device 110A, network device 110B determines whether the packet belongs to a new session (e.g., is the "first" packet or "lead" packet of the session) by determining whether a source address, source port, destination address, destination port, and protocol of the first packet matches an entry in a session table. If no such entry exists, network device 110B determines that the packet belongs to a new session and creates an entry in the session table. Furthermore, if the packet belongs to a new session, network device 110B generates a session identifier for the session. The session identifier used by network device 110B to identify the session for the first packet may be different from the session identifier used by network device 110A to identify the same session for the first packet, because each network device 110A, 110B uses the header source address, source port, destination address, and destination port of the first packet to generate the session identifier, and this information is modified by each preceding network device 110 as each network device 110 forwards the first packet along the forward path. Furthermore, each network device 110 may store this header information to identify a previous network device 110 (or "waypoint") and a next network device 110 (or "waypoint") such that each network device 110 may reconstruct the same forward path and reverse path for each subsequent packet of the session.

Network device 110B replaces the header of the modified first packet to specify a source address that is an address of network device 110B, a source port that is a port via which network device 110B forwards the modified first packet toward destination device 114, a destination address that is an address of the next hop to which network device 110B forwards the first packet (e.g., an address of network device 110C), and a destination port that is a port of the next hop to which network device 110B forwards the first packet (e.g., a port of network device 110C). Network device 110B forwards the modified first packet to network device 110C. Additionally, network device 110B stores the session identifier for the session such that, upon receiving subsequent packets for the session, network device 110B may identify subsequent packets as belonging to the same session and forward the subsequent packets along the same path as the first packet.

Subsequent intermediate network devices 110C-110H process the modified first packet in a similar fashion as network devices 110A and 110B such that network devices 110 forward the subsequent packets of the session along the same path as the first packet. Further, each network device 110 stores a session identifier for the session, which may include an identification of the previous network device 110 along the network path. Thus, each network device 110 may use the session identifier to forward packets of the reverse packet flow for the session along the same network path back to source device 112A.

A network device 110 that may forward packets for a forward packet flow of the session to a destination for the packet flow is an egress, or "terminus" network device. In the foregoing example, network device 110I is a terminus network device because network device 110I may forward packets to CE device 116C for forwarding to destination device 114. Network device 110I receives the modified first packet that comprises the metadata specifying the session identifier (e.g., the original source address, source port, destination address, and destination port). Network device 110I identifies the modified first packet as destined for a service terminating at network device 110I by determining that the destination source address and destination source port specified in the metadata of the modified lead packet corresponds to a destination reachable by network device 110I (e.g., destination device 114 via CE device 116C). Network device 110I recovers the original first packet by removing the metadata from the modified first packet and modifying the header of the first packet to specify the original source address, source port, destination address, and destination port. Network device 110I forwards the recovered first packet to CE device 116C for forwarding to destination device 114.

Additional information with respect to session-based routing and SVR is described in U.S. Pat. No. 9,729,439, entitled "COMPUTER NETWORK PACKET FLOW CONTROLLER," and issued on Aug. 8, 2017; U.S. Pat. No. 9,729,682, entitled "NETWORK DEVICE AND METHOD FOR PROCESSING A SESSION USING A PACKET SIGNATURE," and issued on Aug. 8, 2017; U.S. Pat. No. 9,762,485, entitled "NETWORK PACKET FLOW CONTROLLER WITH EXTENDED SESSION MANAGEMENT," and issued on Sep. 12, 2017; U.S. Pat. No. 9,871, 748, entitled "ROUTER WITH OPTIMIZED STATISTICAL FUNCTIONALITY," and issued on Jan. 16, 2018; U.S. Pat. No. 9,985,883, entitled "NAME-BASED ROUTING SYSTEM AND METHOD," and issued on May 29, 2018; U.S. Pat. No. 10,200,264, entitled "LINK STATUS MONITORING BASED ON PACKET LOSS DETECTION," and issued on Feb. 5, 2019; U.S. Pat. No. 10,277,506, entitled "STATEFUL LOAD BALANCING IN A STATELESS NETWORK," and issued on Apr. 30, 2019; U.S. Pat. No. 10,432,522, entitled "NETWORK PACKET FLOW CONTROLLER WITH EXTENDED SESSION MANAGEMENT," and issued on Oct. 1, 2019; and U.S. Pat. No. 11,075,824, entitled "IN-LINE PERFORMANCE MONITORING," and issued on Jul. 27, 2021, the entire content of each of which is incorporated herein by reference in its entirety.

In some examples, to implement session-based routing, each network device 110 maintains a local repository of service and topology state information for each other network device 110. The service and topology state information includes services reachable from each network device 110, as well as a network topology from each network device for reaching these services. Each network device 110 may transmit changes in the services reachable from the network device 110 and/or changes in the network topology for reaching the services from the network device to a central repository, e.g., a server. Further, each network device 110 may receive service and topology state information for each other network device 110 in computer network system 100 from the central repository.

In the foregoing example, network device 110A receives a packet, determines a session for a packet flow comprising the packet, determines a service associated with the session, and selects a network path for forwarding the packet. Network device 110A may use its local copy of the service and topology state information for each network device 110 to select the network path for forwarding the packet. For example, network device 110A may use the identified service associated with the packet and a network topology for reaching the identified service to select a network path that comports with a Service Level Agreement (SLA) requirement or other performance requirements for the service. Network device 110A may then forward the packet and subsequent packets for the flow along the selected path. In this fashion, network device 110A may perform service-specific path selection in that network device 110 may use criteria specific to the service associated with the packet to select a network path that best suits the requirements of the service.

In some examples, interfaces of network devices 110 may be assigned to one or more "neighborhoods." A "neighborhood" is defined as a label applied to an interface of a network device 110. The network devices 110 within the same neighborhood are capable of forming a peering relationship with one another. For example, each network device 110 having an interface to which a neighborhood label is applied is reachable over a Layer-3 network to each other network device 110 having an interface to which the same neighborhood label is applied. In some examples, one or more neighborhoods may be aggregated into a "district." A district is a logical grouping of one or more neighborhoods. Typically, an Autonomous System (AS) (also referred to herein as an "Authority") may be divided into one or more districts, each district including one or more neighborhoods.

In some examples, each network device 110 maintains a local repository of service and topology state information only for those other network devices 110 within the same neighborhood. In some examples, each network device 110 maintains a local repository of service and topology state information only for those other network devices 110 within the same district of neighborhoods. As an example, each network 102 may be considered to be a different "district," wherein each subdomain within each network 102 may be considered to be a neighborhood within that district. In this example, each network device 110A and 110B within service provider network 102A may maintain service and topology state information only for one another, and not for network devices 110C-110I. Similarly, each network device 110D and 110C within network 102B may maintain service and topology state information only for one another, and not for network devices 110A-110B or 110E-110I. In other examples, an administrator may assign one or more service provider networks 102 into one or more districts, one or more neighborhoods, or a combination of districts and neighborhoods as suits the needs of network system 100.

Additional information with respect to the exchange of service and topology state information is described in U.S. Pat. No. 11,451,464, entitled "CENTRAL AUTHORITY FOR SERVICE AND TOPOLOGY EXCHANGE," and issued on Sep. 20, 2022; U.S. Pat. No. 11,329,912, entitled "SOURCE-BASED ROUTING," and issued on May 10, 2022; U.S. Pat. No. 11,153,202, entitled "SERVICE AND TOPOLOGY EXCHANGE PROTOCOL," and issued on Oct. 19, 2021; U.S. Pat. No. 10,999,182, entitled "ROUTING USING SEGMENT-BASED METRICS," and issued on May 4, 2021; and U.S. Pat. No. 11,165,863, entitled "NETWORK NEIGHBORHOODS FOR ESTABLISHING COMMUNICATION RELATIONSHIPS BETWEEN COMMUNICATION INTERFACES IN AN ADMINISTRATIVE DOMAIN," and issued on Nov. 2, 2021, the entire content of each of which is incorporated herein by reference in its entirety.

NMS 130 is configured to monitor network performance and manage network faults that may impact user experiences in an enterprise network (e.g., experiences of source devices 112 and/or destination device 114 in customer networks 104) based on path data received from one or more network devices 110 operating as network gateways for the enterprise network. NMS 130 receives the path data from network devices 110 and stores the path data received over time in database 135. The path data is indicative of one or more aspects of network performance as monitored on each logical path (e.g., peer path or tunnel) between network devices 110 over the WAN, e.g., a broadband network, Long Term Evolution (LTE) network, or Multi-protocol Label Switching (MPLS) network. NMS 130 includes virtual network assistant 133 having a WAN link health Service Level Expectation (SLE) metric engine that determines one or more WAN link health assessments based on the path data received from network devices 110. Based on the WAN link health assessments, NMS 130 may identify success or failure states associated with the WAN link interface and/or path, identify a root cause of the one or more failure states, and/or automatically recommend or invoke one or more remedial actions to address the identified failure states.

A given network device, e.g., network device 110A, may establish multiple logical paths (e.g., peer paths for a session-based router or tunnels for a packet-based router) on a single physical interface over the WAN with multiple other network devices, e.g., network device 110I. One or more of network devices 110A may include a software agent or other module configured to report path data collected at a logical path level to NMS 130. In other examples, the path data may be retrieved from one or more of network devices 110 by NMS 130 via an API or an open configuration protocol. The cloud-based NMS may store the path data received from the network devices over time and, thus, provide a network performance history of the network devices.

As illustrated in FIG. 1A, NMS 130 includes a virtual network assistant (VNA) 133 configured to monitor the health condition of the logical paths from network devices 110 over the WAN and detect network failures and performance degradation that may impact user experiences. For example, the WAN link health SLE metric engine of virtual network assistant 133 uses a measurement unit of a user-path-minute to measure a health state (e.g., success vs failure) for each user of each logical path each minute, which is multiplied by the number of active users passing traffic through each path during that time interval as a user impact measurement. The WAN link health SLE metric engine may determine a success or failure state associated with one or more of service provider reachability, physical interface operation, or logical path performance based on the path data received from the network devices over time and stored in database 135 and classify the determined failure states. Some examples of failure conditions, i.e., what conditions should be considered as failed user-path-minutes, are as follows: Internet Service Provider (ISP) unreachability, logical path down, logical path performance degradation, interface over-subscription, interface errors, and/or weak/ unstable interface signal strength.

VNA 133 automatically monitors and quantifies a health state of a WAN link (e.g., a physical interface and/or a logical path) based on received path data from network devices 110 over time. For example, the NMS may store the path data in database 135 having a micro-services cloud infrastructure with no scaling limits. As such, the stored path data may provide a network performance history of network devices 110, which may enable the WAN link health SLE metric engine of virtual network assistant 133 to identify performance degradations and/or network failures that may not be detectable from assessments based on a shorter "snapshots" of path data, e.g., as performed by the session-based network devices themselves. More details on the WAN link health SLE metric engine and the logical path down SLE are described in U.S. patent application Ser. No. 17/554,928, entitled "NETWORK PERFORMANCE MONITORING AND FAULT MANAGEMENT BASED ON WIDE AREA NETWORK LINK HEALTH ASSESSMENTS," filed on Dec. 17, 2021, the entire content of which is incorporated herein by reference in its entirety.

VNA 133 may also include an underlying analytics and network error identification engine and alerting system. VNA 133 may further provide real-time alerting and reporting to notify administrators or IT personnel of any predicted events, anomalies, trends, and may perform root cause analysis and automated or assisted error remediation.

In some examples, VNA 133 of NMS 130 may apply machine learning techniques to detect network scope failure and identify the root cause of error conditions detected from the streams of event data. VNA 133 may generate a notification indicative of the root cause and/or one or more remedial actions that may be taken to address the root cause of the error conditions. In some examples, if the root cause may be automatically resolved, VNA 133 invokes one or more remedial or mitigating actions to address the root cause of the error condition, thus automatically improving the underlying wireless network performance and also automatically improving the user experience of the wireless network.

In accordance with the techniques described in this disclosure, VNA 133 may include a WAN scope failure detection engine to identify root causes of logical path failures in a WAN based on a logical path scope analysis, and based on the identified root causes, invoking an action (e.g., providing a notification to an administrator to perform a remedial action or automatically performing the remedial action). Details on wireless local area network (WLAN) scope analysis are described in U.S. patent application Ser. No. 17/446,601, entitled "IDENTIFYING ROOT CAUSE OF FAILURES THROUGH DETECTION OF NETWORK SCOPE FAILURES," filed on Aug. 31, 2021, the entire content of which is incorporated herein by reference in its entirety.

The logical path scope analysis may leverage the logical path down SLE metric for monitoring network performance and managing network faults that may impact user experiences in an enterprise network based on path data received from one or more network devices operating as network gateways in the WAN. The logical path down SLE data defines one or more failure events associated with the logical paths. The logical path down scope analysis includes determining a scope of a logical path down event from among the potential scopes of (from top-down): provider, gateway (hub/spoke), gateway interface (hub/spoke interface), and VNA 133 of NMS 130 performs the logical path scope analysis by aggregating the logical path down SLE data across each scope of the different scopes, obtaining total path data indicative of a historical number of active logical paths between the network devices, and, for a particular logical path down issue, determining a score for each scope of the different scopes based on the logical path down SLE data aggregated across the particular scope and the total path data. VNA 133 determines a scope of the particular logical path down issue as the particular scope of the different scopes having a highest score.

Based on the determined scope of the particular logical path down issue, NMS 130 identifies a root cause of the particular logical path down issue and automatically recommends or invokes one or more remedial actions to address the particular logical path down issue. NMS 130 may generate and output notifications including identification of a root cause of the particular logical path down issue. For example, NMS 130 may generate data representative of a user interface for display on a user interface device, e.g., operated by a network administrator of one or more customer networks 104 of the enterprise network. The user interface may present results of the logical path down scope analysis. NMS 130 may further generate and output notifications, e.g., to the network administrator of the one or more customer networks 104 of the enterprise network, with recommendations to perform one or more remedial actions to address the particular logical path down issue. In other examples, NMS 130 may instead automatically invoke the one or more remedial actions to address the particular logical path down issue.

FIG. 1B is a block diagram illustrating further example details of network system 100 of FIG. 1A. In this example, FIG. 1B illustrates NMS 130 configured to operate according to an artificial intelligence/machine-learning-based computing platform providing comprehensive automation, insight, and assurance (e.g., Wireless Assurance, Wired Assurance and/or WAN Assurance) spanning from a wireless network 173 and wired LAN 175 at the network edge (far left of FIG. 1B) to cloud-based application services 181 hosted by computing resources within data centers 179 (far right of FIG. 1B). Referring back to FIG. 1A, user devices 171 may comprise one or more of source devices 112 and destination device 114, and wired LAN 175 hosting wireless network 173 may comprise one or more customer networks 104 of the enterprise network.

As described herein, NMS 130 provides an integrated suite of management tools and implements various techniques of this disclosure. In general, NMS 130 may provide a cloud-based platform for wireless network data acquisition, monitoring, activity logging, reporting, predictive analytics, network anomaly identification, and alert generation. For example, NMS 130 may be configured to proactively monitor and adaptively configure network system 100 so as to provide self-driving capabilities. Moreover, VNA 133 includes a natural language processing engine to provide AI-driven support and troubleshooting, anomaly detection, AI-driven location services, and AI-drive RF optimization with reinforcement learning.

As illustrated in the example of FIG. 1B, AI-driven NMS 130 also provides configuration management, monitoring and automated oversight of software defined wide-area network (SD-WAN) 177, which operates as an intermediate network communicatively coupling wireless networks 173 and wired LANs 175 to data centers 179 and application services 181. In general, SD-WAN 177 provides seamless, secure, traffic-engineered connectivity between "spoke" routers 187A of edge wired LANs 175 hosting wireless networks 173, such as branch or campus networks (e.g., customer networks 104 from FIG. 1A as sites of an enterprise network), to "hub" routers 187B further up the cloud stack toward cloud-based application services 181. Referring back to FIG. 1A, routers 187A, 187B may comprise network devices 110 operating as network gateways for the enterprise network.

SD-WAN 177 often operates and manages an overlay network on an underlying physical Wide-Area Network (WAN), which provides connectivity to geographically separate customer networks, e.g., customer networks 104 of FIG. 1A. In other words, SD-WAN 177 may extend SDN capabilities and/or session-based routing or SVR capabilities to a WAN that allow networks to decouple underlying physical network infrastructure from virtualized network infrastructure and applications such that the networks may be configured and managed in a flexible and scalable manner.

In some examples, underlying routers of SD-WAN 177 may implement a stateful, session-based routing scheme in which the routers 187A, 187B dynamically modify contents of original packet headers sourced by user devices 171 to steer traffic along selected paths, e.g., logical path 189, toward application services 181 without requiring use of tunnels and/or additional labels. In this way, routers 187A, 187B may be more efficient and scalable for large networks since the use of tunnel-less, session-based routing may enable routers 187A, 187B to achieve considerable network resources by obviating the need to perform encapsulation and decapsulation at tunnel endpoints. Moreover, in some examples, each router 187A, 187B may independently perform path selection and traffic engineering to control packet flows associated with each session without requiring use of a centralized SDN controller for path selection and label distribution. In some examples, routers 187A, 187B implement session-based routing as SVR, provided by Juniper Networks, Inc.

Additional information with respect to session-based routing and SVR is described in U.S. Pat. No. 9,729,439, entitled "COMPUTER NETWORK PACKET FLOW CONTROLLER," and issued on Aug. 8, 2017; U.S. Pat. No. 9,729,682, entitled "NETWORK DEVICE AND METHOD FOR PROCESSING A SESSION USING A PACKET SIGNATURE," and issued on Aug. 8, 2017; U.S. Pat. No. 9,762,485, entitled "NETWORK PACKET FLOW CONTROLLER WITH EXTENDED SESSION MANAGEMENT," and issued on Sep. 12, 2017; U.S. Pat. No. 9,871,748, entitled "ROUTER WITH OPTIMIZED STATISTICAL FUNCTIONALITY," and issued on Jan. 16, 2018; U.S. Pat. No. 9,985,883, entitled "NAME-BASED ROUTING SYSTEM AND METHOD," and issued on May 29, 2018; U.S. Pat. No. 10,200,264, entitled "LINK STATUS MONITORING BASED ON PACKET LOSS DETECTION," and issued on Feb. 5, 2019; U.S. Pat. No. 10,277,506, entitled "STATEFUL LOAD BALANCING IN A STATELESS NETWORK," and issued on Apr. 30, 2019; U.S. Pat. No. 10,432,522, entitled "NETWORK PACKET FLOW CONTROLLER WITH EXTENDED SESSION MANAGEMENT," and issued on Oct. 1, 2019; and U.S. Pat. No. 11,075,824, entitled "IN-LINE PERFORMANCE MONITORING," and issued on Jul. 27, 2021, the entire content of each of which is incorporated herein by reference in its entirety.

In some examples, AI-driven NMS 130 may enable intent-based configuration and management of network system 100, including enabling construction, presentation, and execution of intent-driven workflows for configuring and managing devices associated with wireless networks 173, wired LANs 175, and/or SD-WAN 177. For example, declarative requirements express a desired configuration of network components without specifying an exact native device configuration and control flow. By utilizing declarative requirements, what should be accomplished may be specified rather than how it should be accomplished. Declarative requirements may be contrasted with imperative instructions that describe the exact device configuration syntax and control flow to achieve the configuration. By utilizing declarative requirements rather than imperative instructions, a user and/or user system is relieved of the burden of determining the exact device configurations required to achieve a desired result of the user/system. For example, it is often difficult and burdensome to specify and manage exact imperative instructions to configure each device of a network when various different types of devices from different vendors are utilized. The types and kinds of devices of the network may dynamically change as new devices are added and device failures occur. Managing various different types of devices from different vendors with different configuration protocols, syntax, and software versions to configure a cohesive network of devices is often difficult to achieve. Thus, by only requiring a user/system to specify declarative requirements that specify a desired result applicable across various different types of devices, management and configuration of the network devices becomes more efficient. Further example details and techniques of an intent-based network management system are described in U.S. Pat. No. 10,756,983, entitled "Intent-based Analytics," and U.S. Pat. No. 10,992,543, entitled "Automatically generating an intent-based network model of an existing computer network," each of which is hereby incorporated by reference.

FIG. 1C is a block diagram illustrating further example details of network system 100 of FIG. 1B. In particular, FIG. 1C illustrates an example SD-WAN deployment architecture of SD-WAN 177 of FIG. 1B. In the illustrated example, SD-WAN 177 includes a spoke router 187A within a branch office connecting to a hub router 187B in a data center via logical path 189 over the underlying physical WAN, e.g., MPLS network 188. SD-WAN 177 also includes a hosted or Software as a Service (SaaS) applications.

When troubleshooting SD-WAN issues, it may be beneficial to separate the issues into three segments: 1) branch office, 2) logical path (e.g., peer path or tunnel) over WAN, e.g., MPLS, LTE or Broadband network, and 3) application services including both internally hosted applications (e.g., in the data center) and SaaS applications. NMS 130 may be configured to track the temporal connectivity topology of these three segments for each customer deployment and also detect various types of user-impacting issues in virtual network assistant 133. By joining the connectivity topology with the corresponding events happened in each segment, virtual network assistant 133 of NMS 130 may be able to pinpoint the location and root cause of different user-impacting SD-WAN issues. Examples of user-impacting issues for the branch office segment may include device health, bad cable, and configuration issues (e.g., maximum transmission unit (MTU)). Examples of user-impacting issues for the logical path segment may include link connectivity and link performance degradation. Examples of user-impacting issues for the application services segment may include service reachability and service performance.

NMS 130 is configured to monitor network performance and manage network faults that may impact user experiences in the enterprise network based on path data received from one or more network devices operating as network gateways for the enterprise network (e.g., routers 187A, 187B). NMS 130 receives the path data from routers 187A, 187B that is indicative of one or more aspects of network performance as monitored on each logical path 189, e.g., peer path or tunnel, between routers 187A, 187B in SD-WAN 177 over an underlying physical WAN 188, and stores the path data in database 135 over time.

NMS 130 includes virtual network assistant 133 having a WAN link health SLE metric engine that determines one or more WAN link health assessments based on the path data in database 135. The WAN link health SLE metric engine may aggregate the path data over a selected period of time and at a selected granularity-level (e.g., site-level or network device-level). In accordance with the techniques of this disclosure, WAN link health SLE metric engine may determine failure states associated with logical path performance, e.g., logical path down, based on the aggregated path data, and classify the determined failure states.

Virtual network assistant 133 of NMS 130 further performs a logical path scope analysis by aggregating the logical path down SLE data across each scope from among the potential scopes of (from top-down): provider, gateway (hub/spoke), gateway interface (hub/spoke interface), and logical path, obtaining total path data indicative of a historical number of active logical paths between the network devices, and, for a particular logical path down issue, determining a score for each scope of the different scopes based on the logical path down SLE data aggregated across the particular scope and the total path data. NMS 300 determines a scope of the particular logical path down issue as the particular scope of the different scopes having a highest score. Based on the determined scope of the particular logical path down issue, the NMS identifies a root cause of the particular logical path down issue and automatically recommends or invokes one or more remedial actions to address the particular logical path down issue.

Figure 2:
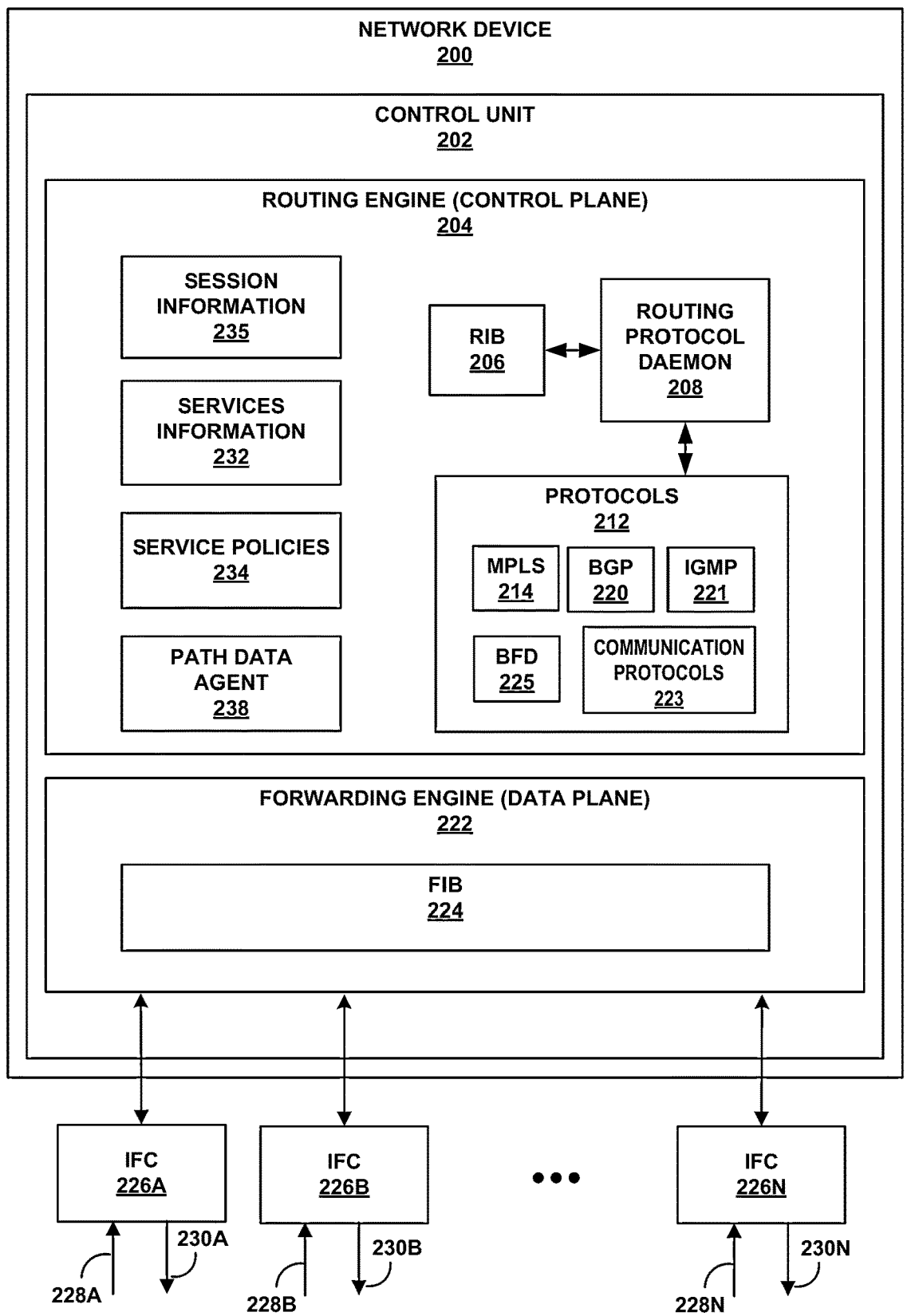
FIG. 2 is a block diagram illustrating an example network device, in accordance with the techniques of the disclosure.

FIG. 2 is a block diagram illustrating an example network device 200 in accordance with the techniques of the disclosure. In general, network device 200 may be an example of one of network devices 110 of FIG. 1A or one of routers 187A, 187B of FIGS. 1B and 1C. In this example, network device 200 includes interface cards 226A-226N ("IFCs 226") that receive packets via incoming links 228A-228N ("incoming links 228") and send packets via outbound links 230A-230N ("outbound links 230"). IFCs 226 are typically coupled to links 228, 230 via a number of interface ports. Network device 200 also includes a control unit 202 that determines routes of received packets and forwards the packets accordingly via IFCs 226.

Control unit 202 may comprise routing engine 204 and forwarding engine 222. Routing engine 204 operates as the control plane for network device 200 and includes an operating system that provides a multi-tasking operating environment for execution of a number of concurrent processes. Routing engine 204 communicates with other routers, e.g., such as network devices 110 of FIG. 1A, to establish and maintain a computer network, such as network system 100 of FIGS. 1A-1C, for transporting network traffic between one or more customer devices. Routing protocol daemon (RPD) 208 of routing engine 204 executes software instructions to implement one or more control plane networking protocols 212. For example, protocols 212 may include one or more routing protocols, such as Internet Group Management Protocol (IGMP) 221 and/or Border Gateway Protocol (BGP) 220, for exchanging routing information with other routing devices and for updating routing information base (RIB) 206, Multiprotocol Label Switching (MPLS) protocol 214, and other routing protocols. Protocols 212 may further include one or more communication session protocols 223, such as transmission control protocol (TCP), user datagram protocol (UDP), transport layer security (TLS), or internet control message protocol (ICMP). Protocols 212 may also include one or more performance monitoring protocols, such as bidirectional forwarding detection (BFD) 225.

RIB 206 may describe a topology of the computer network in which network device 200 resides, and may also include routes through the shared trees in the computer network. RIB 206 describes various routes within the computer network, and the appropriate next hops for each route, i.e., the neighboring routing devices along each of the routes. Routing engine 204 analyzes information stored in RIB 206 and generates forwarding information for forwarding engine 222, stored in forwarding information base (FIB) 224. FIB 224 may associate, for example, network destinations with specific next hops and corresponding IFCs 226 and physical output ports for output links 230. FIB 224 may be a radix tree programmed into dedicated forwarding chips, a series of tables, a complex database, a link list, a radix tree, a database, a flat file, or various other data structures.

FIB 224 may also include lookup structures. Lookup structures may, given a key, such as an address, provide one or more values. In some examples, the one or more values may be one or more next hops. A next hop may be implemented as microcode, which when executed, performs one or more operations. One or more next hops may be "chained," such that a set of chained next hops perform a set of operations for respective different next hops when executed. Examples of such operations may include applying one or more services to a packet, dropping a packet, and/or forwarding a packet using an interface and/or interface identified by the one or more next hops.

Session information 235 stores information for identifying sessions. In some examples, session information 235 is in the form of a session table. For example, services information 232 comprises one or more entries that specify a session identifier. In some examples, the session identifier comprises one or more of a source address, source port, destination address, destination port, or protocol associated with a forward flow and/or a reverse flow of the session. As described above, when routing engine 204 receives a packet for a forward packet flow originating from a client device, e.g., source device 112A of FIG. 1, and destined for another client device, e.g., destination device 114 of FIG. 1, routing engine 204 determines whether the packet belongs to a new session (e.g., is the "first" packet or "lead" packet of a session). To determine whether the packet belongs to a new session, routing engine 204 determines whether session information 235 includes an entry corresponding to a source address, source port, destination address, destination port, and protocol of the first packet. If an entry exists, then the session is not a new session. If no entry exists, then the session is new and routing engine 204 generates a session identifier for the session and stores the session identifier in session information 235. Routing engine 204 may thereafter use the session identifier stored in session information 235 for the session to identify subsequent packets as belonging to the same session.

Services information 232 stores information that routing engine 204 may use to identify a service associated with a session. In some examples, services information 232 is in the form of a services table. For example, services information 232 comprises one or more entries that specify a service identifier and one or more of a source address, source port, destination address, destination port, or protocol associated the service. In some examples, routing engine 204 may query services information 232 with one or more of a source address, source port, destination address, destination port, or protocol of a session for a received packet to determine a service associated with a session. For example, routing engine 204 may determine a service identifier based on a correspondence of a source address, source port, destination address, destination port, or protocol in services information 232 to a source address, source port, destination address, destination port, or protocol specified by a session identifier. Routing engine 204 retrieves, based on the service associated with the packet, one or more service policies 234 corresponding to the identified service. The service policies may include, e.g., a path failover policy, a Dynamic Host Configuration Protocol (DHCP) marking policy, a traffic engineering policy, a priority for network traffic associated with the session, etc. Routing engine 204 applies, to the packet, the one or more service policies 234 that correspond to the service associated with the packet.

In some examples, network device 200 may comprise a session-based router that employs a stateful, session-based routing scheme that enables routing engine 204 to independently perform path selection and traffic engineering. The use of session-based routing may enable network device 200 to eschew the use of a centralized controller, such as an SDN controller, to perform path selection and traffic engineering, and eschew the use of tunnels. In some examples, network device 200 may implement session-based routing as Secure Vector Routing (SVR), provided by Juniper Networks, Inc. In the case where network device 200 comprises a session-based router operating as a network gateway for a site of an enterprise network, network device 200 may establish multiple peer paths over an underlying physical WAN with one or more other session-based routers operating as network gateways for other sites of the enterprise network.

Although primarily described herein as a session-based router, in other examples, network device 200 may comprise a packet-based router in which routing engine 204 employs a packet- or flow-based routing scheme to forward packets according to defined network paths, e.g., established by a centralized controller that performs path selection and traffic engineering. In the case where network device 200 comprises a packet-based router operating as a network gateway for a site of an enterprise network, network device 200 may establish multiple tunnels over an underlying physical WAN with one or more other packet-based routers operating as network gateways for other sites of the enterprise network.

Control unit 202 of network device 200 is configured to collect logical path statistics via BFD 225 probing and data extracted from messages and/or counters at the logical path (e.g., peer path or tunnel) level. In some examples, control unit 202 is configured to collect statistics and/or sample other data according to a first periodic interval, e.g., every 3 seconds, every 5 seconds, etc. Control unit 202 may store the collected and sampled data as path data, e.g., in a buffer. In some examples, a path data agent 238 may periodically create a package of the statistical data according to a second periodic interval, e.g., every 3 minutes. The collected and sampled data periodically reported in the package of statistical data may be referred to herein as "oc-stats." In some examples, the package of statistical data may also include details about clients connected to network device 200 and the associated client sessions. Path data agent 238 may then report the package of statistical data to NMS 130 in the cloud. In other examples, NMS 130 may request, retrieve, or otherwise receive the package of statistical data from network device 200 via an API, an open configuration protocol, or another of communication protocols 223. The package of statistical data created by path data agent 238 or another module of control unit 202 may include a header identifying network device 200 and the statistics and data samples for each of the logical paths from network device 200. In still other examples, the path data agent 238 reports event data to NMS 130 in the cloud in response to the occurrence of certain events at network device 200 as the events happen. The event-driven data may be referred to herein as "oc-events."

Figure 3A:
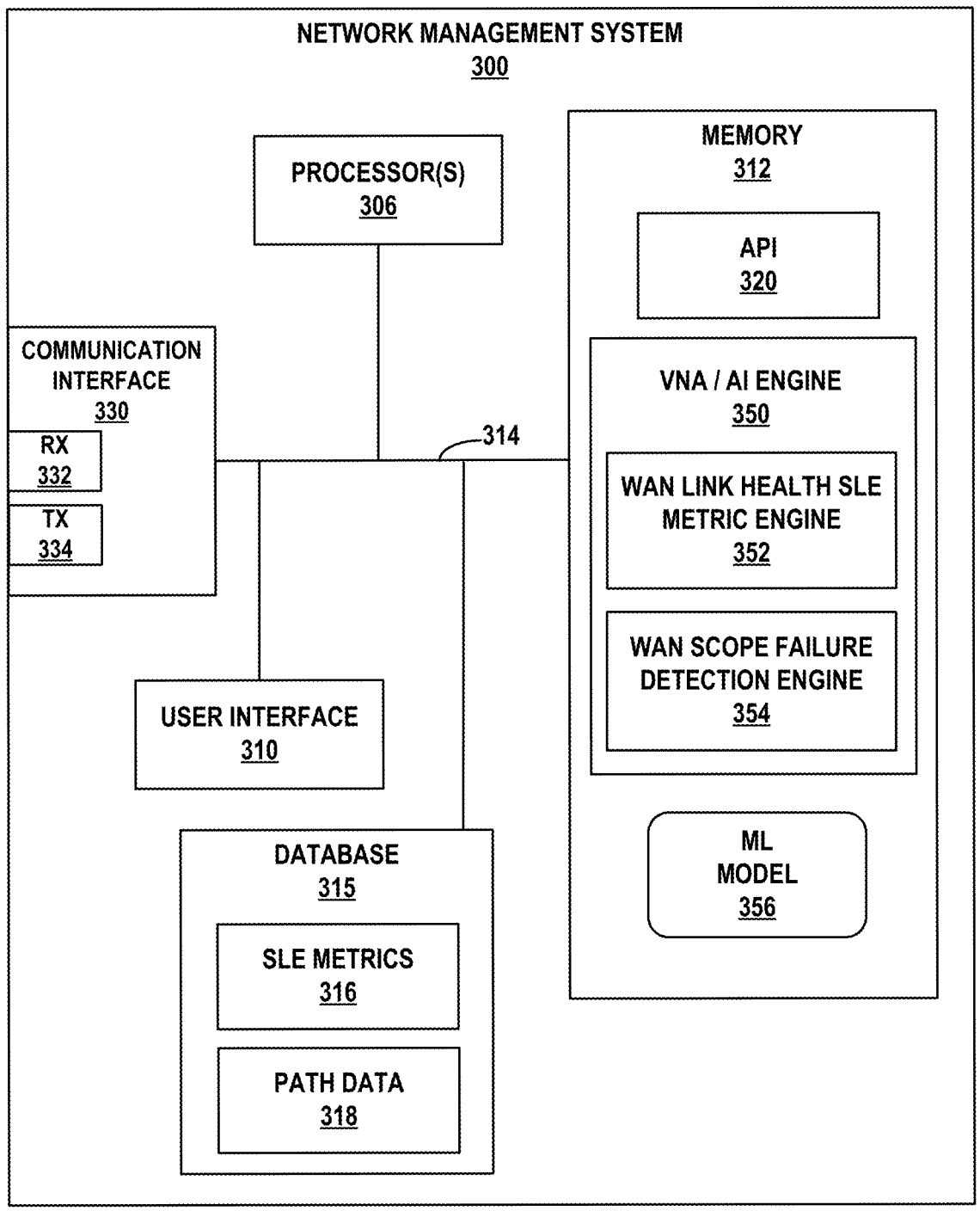
FIGS. 3A and 3B are block diagrams illustrating an example network management system, in accordance with the techniques of the disclosure.
Figure 3B:
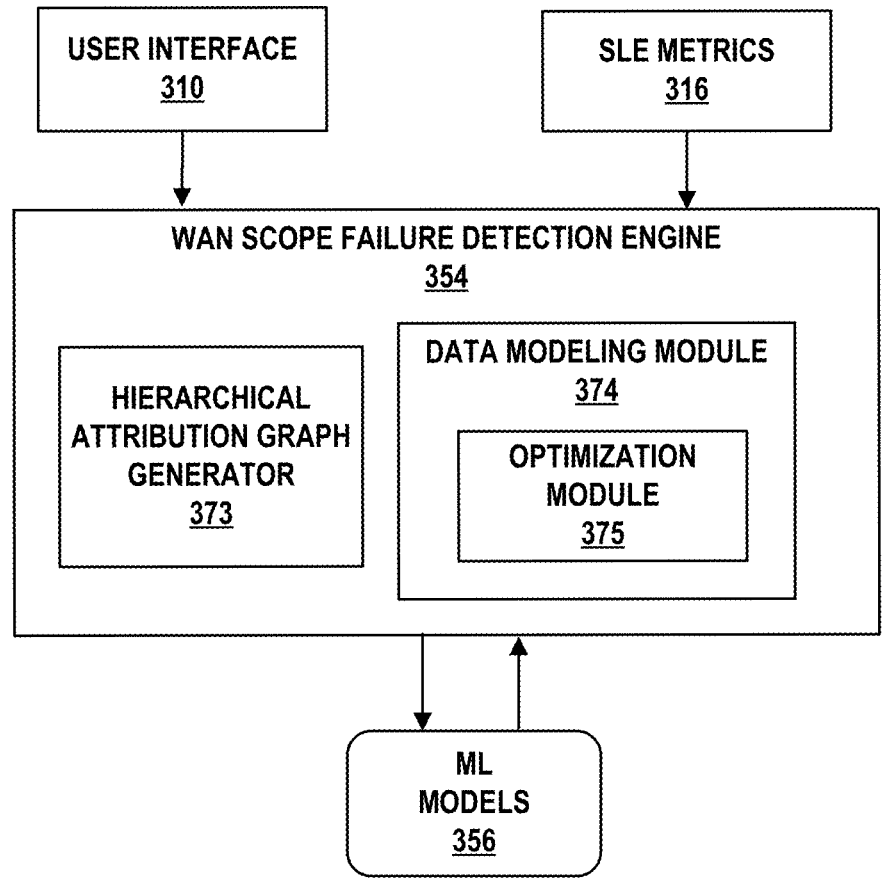

FIGS. 3A and 3B are block diagrams illustrating an example network management system, in accordance with the techniques of the disclosure.

FIG. 3A shows an example network management system (NMS) 300 configured in accordance with one or more techniques of this disclosure. NMS 300 may be used to implement, for example, NMS 130 in FIGS. 1A-1C. In such examples, NMS 300 is responsible for monitoring and management of one or more of network devices 110A-110I of FIG. 1A of networks 102, routers 187A, 187B of FIGS. 1B-1C, or network device 200 of FIG. 2. In some examples, NMS 300 may be a server as part of a micro-services cloud infrastructure within or accessible by network system 100 of FIGS. 1A-1C.

In this example, NMS 300 receives path data collected by network devices 110A-110N. The path data may comprise periodically reported statistics and data samples at a logical path (e.g., peer path or tunnel) level, such as telemetry data and data extracted from messages and/or counters. In some examples, the path data may also include details about clients connected to the network devices 110. In further examples, the path data may include event-driven data that is reported in response to the occurrence of certain events at network devices 110. NMS 300 uses the path data to calculate one or more SLE metrics in order to monitor the health condition of the logical paths from network devices 110 over an underlying physical WAN and detect network failures and performance degradation that may impact user experiences.

In accordance with the disclosed techniques, NMS 300 performs a logical path down scope analysis based on logical path down SLE data to identify root causes of logical path failures in the WAN. Based on the identified root causes, NMS 300 may invoke an action (e.g., providing a notification to an administrator to perform a remedial action or automatically performing the remedial action). The logical path down SLE data defines one or more failure events associated with the logical paths. The logical path down scope analysis includes determining a scope of a logical path down event from among the potential scopes of (from top-down): provider, gateway (hub/spoke), gateway interface (hub/spoke interface), and logical path.

In some examples, in addition to monitoring network devices 110, NMS 300 is also responsible for monitoring and management of one or more wireless or wired networks (e.g., wireless network 173 and wired LAN 175 of FIG. 1B), in addition to monitoring network devices of service providers or other networks. In this example, NMS 300 also receives data collected by access points from user equipment (e.g., user devices 171 of FIG. 1B), such as data used to calculate one or more SLE metrics, and analyzes this data for cloud-based management of the wireless networks. In this manner, a single NMS 300 can be used for management of both network devices 110, which may include virtualized network devices (e.g., software-based routers executing on a virtual machine or container), and wireless networks, for an end-to-end WAN assurance system viewable via a single cloud-based WAN assurance portal.

NMS 300 includes a communications interface 330, one or more processor(s) 306, a user interface 310, a memory 312, and a database 315. The various elements are coupled together via a bus 314 over which the various elements may exchange data and information. Processor(s) 306 execute software instructions, such as those used to define a software or computer program, stored to a computer-readable storage medium (such as memory 312), such as non-transitory computer-readable mediums including a storage device (e.g., a disk drive, or an optical drive) or a memory (such as Flash memory or RAM) or any other type of volatile or non-volatile memory, that stores instructions to cause the one or more processors 306 to perform the techniques described herein.

Communications interface 330 may include, for example, an Ethernet interface. Communications interface 330 couples NMS 300 to a network and/or the Internet, such as any of network(s) 102 as shown in FIG. 1, and/or any wide area networks or local area networks. Communications interface 330 includes a receiver 332 and a transmitter 334 by which NMS 300 receives/transmits data and information to/from any of network devices 110 and/or any other devices or systems forming part of networks 102 or 104 such as shown in FIG. 1. The data and information received by NMS 300 may include, for example, SLE-related or event log data received from network devices 110 and used by NMS 300 to remotely monitor the performance of network devices 110 and networks 102. Database 315 of NMS 300 may store the SLE-related data and/or event log data received from network devices 110 as path data 318. In some examples, NMS may further transmit data via communications interface 330 to any of network devices 110 to remotely manage networks 102.

Memory 312 includes one or more devices configured to store programming modules and/or data associated with operation of NMS 300. For example, memory 312 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 306 to perform the techniques described herein.

In this example, memory 312 includes an API 320, a virtual network assistant (VNA)/AI engine 350 including a WAN link health SLE metric engine 352 and a WAN scope failure detection engine 354, and an ML model 356. NMS 300 may also include any other programmed modules, software engines and/or interfaces configured for remote monitoring and management of network devices 110, including remote monitoring and management of any of network devices 110. NMS 300 may also include any other programmed modules, software engines and/or interfaces configured for remote monitoring and management of wireless networks, including remote monitoring and management of access points.

VNA/AI engine 350 analyzes path data 318 received from network devices 110 as well as its own data to identify when undesired or abnormal states are encountered in one of networks 102. More specifically, WAN link health SLE metric engine 352 enables set up and tracking of failure states or events associated with a WAN link interface and/or path for each network device 110 and/or each network 102. WAN link health SLE metric engine 352 further analyzes SLE-related data (i.e., path data 318) collected by network devices 110, such as any of network devices 110. For example, NMS 300 receives path data 318 from network devices 110 that is indicative of one or more aspects of network performance as monitored on each logical path, e.g., peer path or tunnel, between network devices 110 in an SD-WAN over an underlying physical WAN, and stores path data 318 in database 315 over time. Path data 318 may include periodically reported data and event-driven data. For example, NMS 300 may receive path data 318 as a package of statistical data from each network device 110 on a periodic interval, e.g., every 3 minutes. The portion of path data 318 periodically reported in the package of statistical data may be referred to herein as "oc-stats." In some examples, the package of statistical data may also include details about clients connected to network devices 110 and the associated client sessions. The package of statistical data received from each network device 110 may include a header identifying the respective network device 110 and multiple statistics and data samples for each of the logical paths. In some examples, path data 318 may include event-driven data received from network devices 110 in response to the occurrence of certain events at network devices 110 as the events happen. The portion of path data 318 that includes event-driven data may be referred to herein as "oc-events." In some examples, NMS 300 may store path data 318 in a database having a micro-services cloud infrastructure with no scaling limits.

NMS 300 executes WAN link health SLE metric engine 352 to determine one or more WAN link health assessments based on path data 318. WAN link health SLE metric engine 352 may process the "oc-stats" data into "oc-stats-analytics" messages that include different fields used to calculate the classifiers and sub-classifiers of the WAN link health SLE metric. In addition, WAN link health SLE metric engine 352 may process the "oc-stats" data into "session-stats-analytics" messages that include the details about the clients connected to network devices 110 and the associated client sessions, which may be used to track the impact of deterioration of WAN link health on the connected clients. WAN link health SLE metric engine 352 may also process the "oc-events" data to identify the certain events used to calculate the classifiers and sub-classifiers of the WAN link health SLE metric. For example, WAN link health SLE metric engine 352 may be configured to identify DHCP_RESOLVED, DHCP_UNRESOLVED, ARP_RESOLVED, ARP_UNRESOLVED, PEER_PATH_UP, PEER_PATH_DOWN, IPSEC_TUNNEL_UP, and IPSEC_TUNNEL_DOWN events within the "oc-event" data received from network devices 110. The processed "oc-stats" and "oc-event" data within path data 318 may be stored as SLE metrics 316 in database 315.

WAN link health SLE metric engine 352 uses a measurement unit of a user-path-minute to measure a health state (e.g., success vs failure) for each user of each logical path each minute, which is multiplied by the number of active users passing traffic through each path during that time interval as a user impact measurement. WAN link health SLE metric engine 352 may aggregate SLE metrics 316 over a selected period of time (e.g., today, last 7 days, etc.) and at a selected granularity-level (e.g., site-level or network device-level). WAN link health SLE metric engine 352 may determine a success or failure state associated with one or more of service provider reachability, physical interface operation, or logical path performance based on aggregated SLE metrics 316 and classify the determined failure states. As an example, WAN link health SLE metric engine 352 is configured to determine a failure state associated with logical path performance based on one or more logical path down events, e.g., peer path down events or IPsec tunnel down events, included in the logical path down SLE data of SLE metrics 316.

NMS 300 executes WAN scope failure detection engine 354 to determining a scope of a logical path down event from among the potential scopes of (from top-down): provider, gateway (hub/spoke), gateway interface (hub/spoke interface), and logical path. In this way, WAN scope failure detection engine 354 identifies the root cause of the failure state associated with the logical path down event. In some examples, WAN scope failure detection engine 354 utilizes artificial intelligence-based techniques and/or machine learning models 356 to determine the scope of logical path down events within the WAN by evaluating logical path down events of SLE metrics 316 with respect to each network scope (e.g., node) of a hierarchical attribution graph. Additionally, or alternatively, WAN scope failure detection engine 354 utilizes artificial intelligence-based techniques and/or machine learning models 356 to identify whether a particular network scope (e.g., particular node in hierarchical attribution graph) is the root cause of the logical path failure. A more detailed view of WAN scope failure detection engine 354 is described and illustrated in FIG. 3B.

In accordance with the techniques of this disclosure, WAN scope failure detection engine 354 is configured to generate a hierarchical attribution graph, wherein the hierarchical attribution graph comprises attributes representing different scopes at different hierarchical levels of a WAN. For example, the different scopes may include provider, network device or gateway (hub/spoke), network device or gateway interface (hub/spoke interface), and logical path. WAN scope failure detection engine 354 is configured to obtain the logical path down data from SLE metrics 316 in database 315, which is based on path data 318 reported to NMS 300 by network devices 110 that is indicative of operational behavior of one or more logical paths of a physical interface from the given network device over the WAN. The logical path down data of SLE metrics 316 includes one or more failure events associated with the one or more logical paths. WAN scope failure detection engine 354 is configured to obtain total path data indicative of a historical number of active logical paths between one or more of network devices 110. The total path data may be obtaining from path data 318 in database 315, which stores path data 318 over time.

For a time period of a particular logical path down issue, WAN scope failure detection engine 354 is configured to determine a score for each scope of the different scopes based on the logical path down data aggregated across the particular scope and the total path data. WAN scope failure detection engine 354 is configured to determine a scope of the logical path down issue as the particular scope of the different scopes having a highest score. WAN scope failure detection engine 354 may further identify the particular scope of the different scopes as a root cause of the logical path down issue based on the determination that the particular scope has the highest score of the different scopes.

In addition, VNA/AI engine 350 may automatically invoke one or more corrective actions intended to address the identified root cause(s) of one or more logical path down events in SLE metrics 316. Examples of corrective actions that may be automatically invoked by VNA/AI engine 350 may include, but are not limited to, invoking API 320 to reboot one or more network devices 110. The corrective actions may further include restarting a switch and/or a router, invoking download of new software to a network device, switch, or router, etc. These corrective actions are given for example purposes only, and the disclosure is not limited in this respect. If automatic corrective actions are not available or do not adequately resolve the root cause, VNA/AI engine 350 may proactively provide a notification including recommended corrective actions to be taken by IT personnel to address the network error. VNA/AI engine 350 may output a notification including identification of the root cause of the logical path down event. In some scenarios, VNA/AI engine 350 may output the notification via a user interface 310 for display on a user interface device of an administrator associated with the enterprise network. In some examples, the notification includes a recommendation to perform the one or more remedial or corrective actions to address the root cause of the logical path down event.

In the example of FIG. 3B, WAN scope failure detection engine 354 includes hierarchical attribution graph generator 373 and data modeling module 374. WAN scope failure detection engine 354 may include some or all of these modules and may also include other modules for detection of network scope failures. Hierarchical attribution graph generator 373 generates a hierarchical attribution graph. Hierarchical attribution graph may include attributes representing WAN scopes and attribute relationships.

WAN scope failure detection engine 354 may apply ML models 356 to a hierarchical attribution graph generated by hierarchical attribution graph generator 373 and one or more logical path down events received by NMS 300 (e.g., included in SLE metrics 316). ML models 356 may comprise of different supervised ML models that are applied to different network scopes in the hierarchical attribution graph. For instance, WAN scope failure detection engine 354 may apply a first supervised ML model to a first network scope in the hierarchical attribution graph (e.g., provider scope), additionally or alternatively, WAN scope failure detection engine 354 may apply a second supervised ML model to a second network scope in the hierarchical attribution graph (e.g., network device or gateway scope). In a similar manner, WAN scope failure detection engine 354 may apply a third supervised ML model to a third network scope in the hierarchical attribution graph (e.g., network device or gateway interface scope), and WAN scope failure detection engine 354 may apply a fourth supervised ML model to a fourth network scope in the hierarchical attribution graph (e.g., logical path scope). Each of the supervised ML models may be configured with one or more parameters (e.g., model labels) to detect network scope failure.

WAN scope failure detection engine 354 may additionally, or alternatively, evaluate the logical path down events with respect to each of the nodes of the hierarchical attribution graph to identify the root cause of the failure. WAN scope failure detection engine 354 may evaluate the failure network events with respect to a particular network scope (e.g., particular node in the hierarchical attribution graph) to determine whether to attribute the failure to a higher scope level (e.g., a node with a higher hierarchy) in the hierarchical attribution graph. WAN scope failure detection engine 354 may, as one example, evaluate failure network events with respect to the node with the highest hierarchy in the hierarchical attribution graph (e.g., the provider scope) and, if WAN scope failure detection engine 354 determines the failure is not attributed to the highest scope level, progressively evaluate peer path down events with respect to a node with a lower hierarchy. If the failure is not attributed to any of the higher scope levels, WAN scope failure detection engine 354 may determine that the root cause of the failure is at the logical path scope level.

Figure 5:
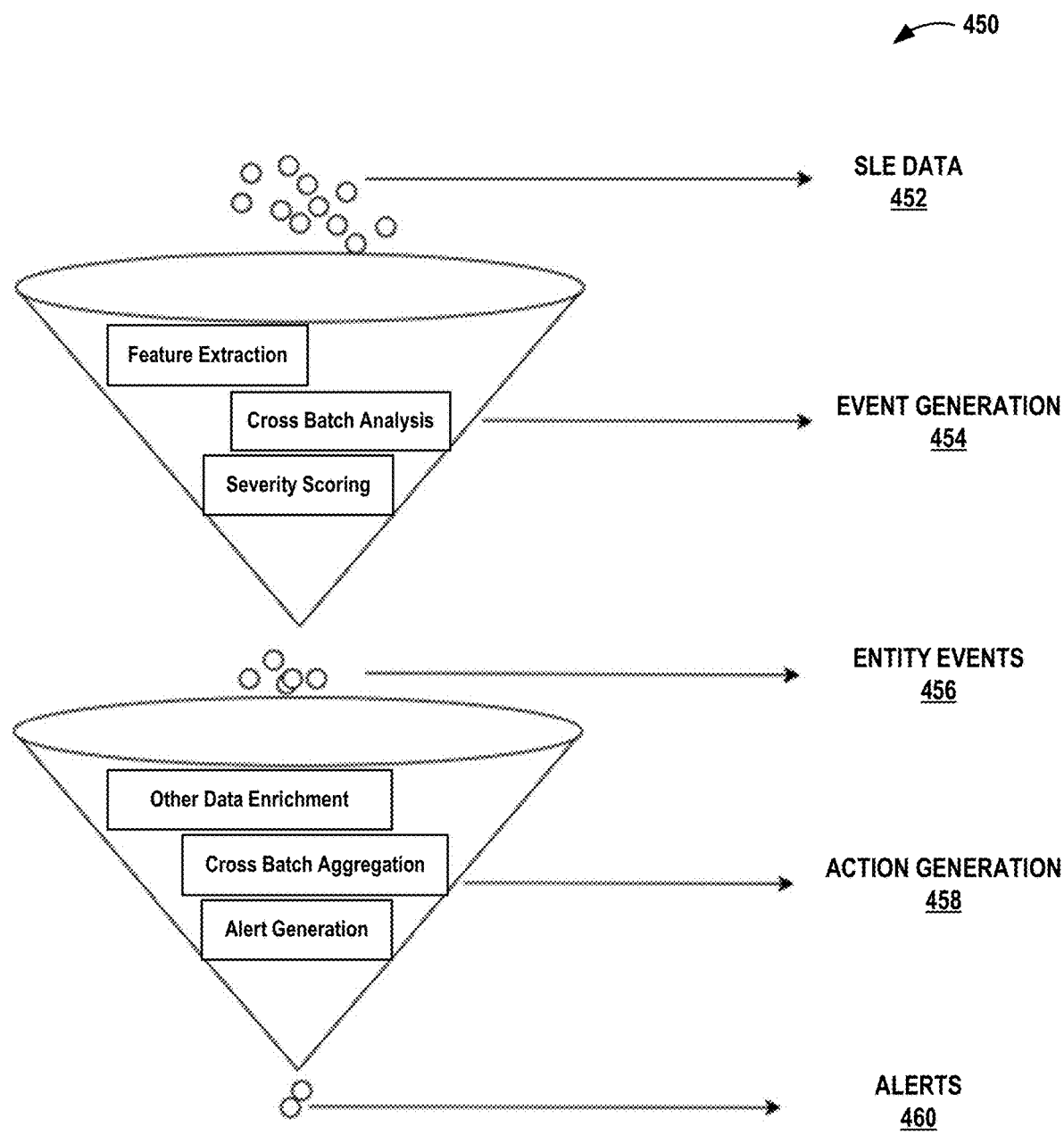
FIG. 5 is a conceptual diagram illustrating a data flow of the logical path down scope analysis, in accordance with the techniques of the disclosure.

By applying ML models 356 to the hierarchical attribution graph, peer path down SLE data and total path data, WAN scope failure detection engine 354 may detect WAN scope failure and or identify the root cause of logical path down issues. WAN scope failure detection engine 354 may, in some examples, execute a parallel process and/or a funnel process to detect network scope failure, identify root cause of failure, and/or determine a remedial or corrective action, as illustrated in FIG. 5.

In some examples, WAN scope failure detection engine 354 includes a data modeling module 374 to model the SLE data 316 for the WAN scope failure detection process. In some examples, data modeling module 374 includes an optimization module 375 to optimize the network scope failure detection process. For example, optimization module 375 may filter out irrelevant and/or unnecessary events (e.g., neutral events) to reduce the number of records to process.

Figure 4:
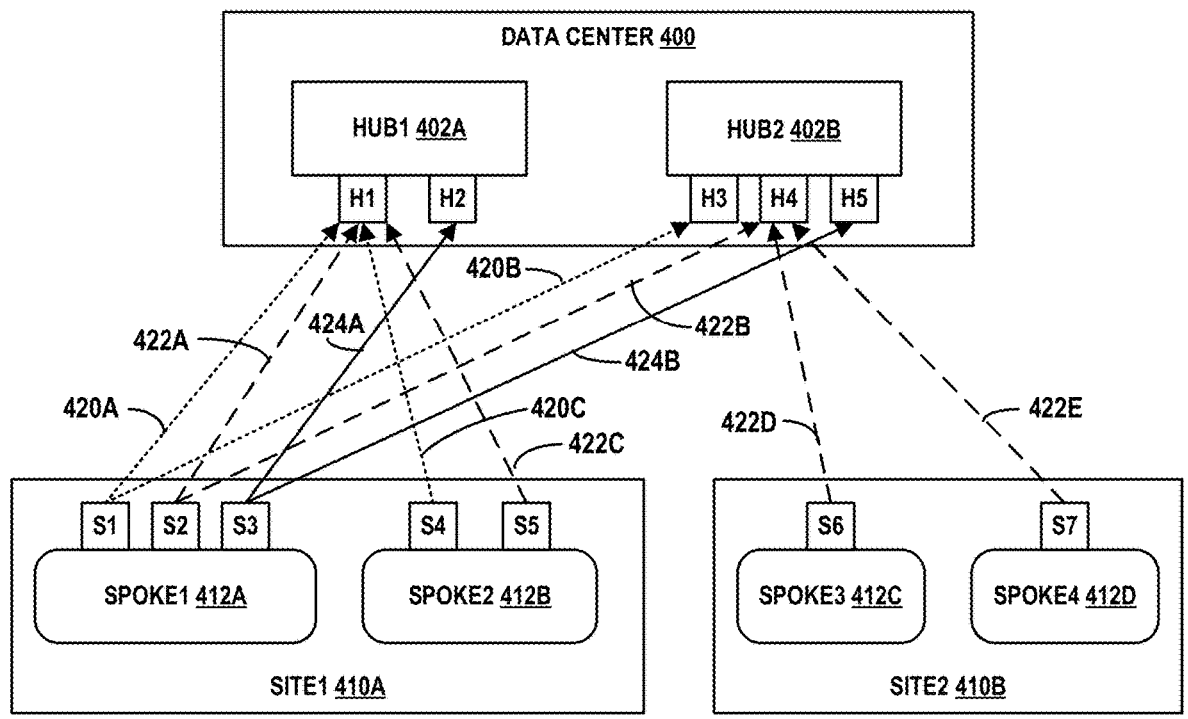
FIG. 4 is a block diagram illustrating example spoke and hub routers interconnected via logical paths in a WAN in order to demonstrate different scopes included in a logical path down scope analysis, in accordance with the techniques of the disclosure.

FIG. 4 is a block diagram illustrating example spoke and hub routers interconnected via logical paths in a WAN in order to demonstrate different scopes included in a logical path down scope analysis, in accordance with the techniques of the disclosure. The example of FIG. 4 is described with respect to peer paths between session-based routers, but is similarly applicable to any logical path between network devices operating as network gateways.

Peer-paths are the logical links between spoke routers 412A-412D (collectively, "spoke routers 412") and hub routers 402A-402B (collectively, "hub routers 402"). Spoke and hub routers 412, 420 have a variety of transport type connections such as LTE connections 420A-420C (represented in FIG. 4 as dotted lines), Broadband connections 422A-422E (represented in FIG. 4 as dashed lines), and MPLS connections 424A-424B (represented in FIG. 4 as solid lines). Each of these transport connections are supported by respective service providers.

As illustrated in FIG. 4, data center 400 includes hub1 402A with interfaces H1 and H2, and hub2 402B with interfaces H3, H4, and H5. In addition, site1 410A includes spoke1 412A with interfaces S1, S2, and S3, and spoke2 412B with interfaces S4 and S5. Site2 410B includes spoke3 412C with interface S6 and spoke4 412D with interface S7. As shown in FIG. 4, spoke1 412A has connectivity to both hub1 402A and hub2 402B in data center 400. More specifically, interface S1 provides LTE connections 420A-420B, interface S2 provides Broadband connections 422A-422B, and interface S3 provides MPLS connections 424A-424B to each of hub1 402A and hub2 402B. Spoke2 412B has connectivity to hub1 402A with interface S4 providing LTE connection 420C and interface S5 proving Broadband connection 422C to hub1 402A. Spoke3 412C has connectivity to hub2 402B with interface S6 providing Broadband connection 422D to hub2 402B. Spoke4 412D has connectivity to hub2 402B with interface S7 providing Broadband connection 422E to hub2 402B.

If any of the active peer-paths goes down, the connectivity can still be supported through other peer-paths (provided there are more than one peer-paths connecting the spoke and the hub). There may be degradation in the service level but most often this can be non-disruptive hence often non-visible to the customer. However, if multiple paths go down one after the other, then such a scenario could be disruptive, and the level of impact depends upon the scope of issue. For example, if all the peer-paths originating from a spoke (e.g., LTE connection 420C and Broadband connection 422C from spoke2 412B) go down, then no clients would be able to send traffic through spoke router 412B. This is a problem and it is a spoke level problem. Another example of a different scope would be if there is an issue with the LTE service provider, like AT&T, then all the traffic using the LTE based network (e.g., LTE connections 420A-420C provided by interfaces S1 of spoke1 412A and S4 of spoke2 412B) would be impacted. In each of these scenarios, NMS 130/300 is configured to detect the path down events and at the same time identify the scope of the impact.

In the example of FIG. 4, a WAN has five different scopes of peer-path down issues based upon the extent of the impact. The scope analysis described herein follows a top-down approach (provider→gateway hub→gateway spoke→interface→peer-path).

Provider Level: In this scenario, the network provider is witnessing an outage or any other connectivity issues. Direct use or analysis of such outage information is difficult, but an indirect method may be applied to deduce a provider issue. For example, to verify if a particular provider network is affected, NMS 130/300 may determine whether the peer-paths using that transport type are down across multiple organizations. For example, if AT&T is having a local LTE outage which provides network connection to Site1 410A, then all the peer-paths in Site1 410A with LTE connections 420A-420C (S1→H1, S4→H1) connecting to hub1 402A will see the impact and the scope of the peer-path down.

Similarly, if the same provider is providing network connection to another site belonging to a different organization, then all the paths within that site/organization will be affected. There is a chance that two sites within different organizations are having internal issues that might have caused the peer-paths to be down, but the chances of such a scenario that spread across multiple organizations and that is specific to a transport type is rare, unless there is an outage from a common network provider. The higher the number of organizations being affected in similar fashion, the higher the chance that the issue is with the provider rather than organization or site level issues. The probability further increases if these path down events are detected within a smaller time window. Hence both the extent of the issue (across organizations) and affected time period are important to detect provider scope of peer-path down events. In this case the scope of the path down event may be "service_provider_down."

To determine the network provider information, NMS 130/300 may use the network interface IP address and do a reverse lookup to deduce the information. Service provider details (Name and ASN (Autonomous System Number)) are pre-populated in an upstream pipeline in the cloud as a part of oc-stats-analytics data, so that NMS 130/300 can use that in provider-level scope analysis. Currently the percentage of public IPs available in the cloud for the interfaces in peer paths may be limited. From the latest analysis, the current spoke-level public IP coverage is around 29%. For LTE interface, oc-stats comes with the provider information.

Gateway Hub Level: In this case, all the paths terminating at a hub are witnessing the peer-path down issue. In the illustrated example of FIG. 4, if all the peer-paths 420B, 422B-422D, and 424B reaching hub2 402B (S1→H3, S2→H4, S3→H5, S6→H4, S7→H4) go down, then this is a hub level scope. In which case, NMS 130/300 identifies the event_type as "hub_gateway_down." Gateway Spoke Level: In this case, all the paths originating from a spoke are witnessing the peer-path down issue. For example, if all the peer-paths 420C and 422C between spoke2 412B and hub1 402A (S4→H1, S5→H1) go down, then this is a spoke level scope. In which case, NMS 130/300 may identify the event_type as "spoke_gateway_down" or "source_gateway_ down."

Gateway Spoke or Hub Interface Level: In this case, all the peer-paths originating from a spoke interface appear to be down. For example, if all the peer-paths 420A-420B originating from S1 of spoke1 412A (S1→H1, S1→H3) go down, then this is a "spoke_interface_down" scope. NMS 130/300 performs a similar analysis from the hub end, where if all the paths connected to a hub's interface are detected to be down, then NMS 130/300 detects this as hub interface level scope. For example, the scope is hub interface if all the paths 420A, 422A, 420C, and 422C connected to H1 of hub1 402A (S1→H1, S2→H1, S4→H1, S5→H1) go down. This indicates that the issue lies with the H1 interface of hub1 420A and the scope of the issue is "hub_interface_down."

Logical Path: If none of the above scopes are identified, NMS 130/300 treats the issue at the individual peer-path level. If a path goes down the result of such scenario, it may not have a severe consumer impact (besides some degradation in data transport quality) as long as there are other peer-paths to which the data can be redirected. This is done implicitly within session-based routers. However, there are two scenarios at the path level where path-down detection is important. The first scenario is referred to as "Extended and Consistent Path Down." In this scenario, a path is detected to be down for an extended period and consistently. A second scenario is referred to as "Path Flapping." In this scenario, a path is detected to switch between up and down status very frequently. Such a path with have very inconsistent behavior with data transfer and hence detection of such a path is important.

FIG. 5 is a conceptual diagram illustrating a data flow of the logical path down scope analysis, in accordance with the techniques of the disclosure. The remedial or corrective actions determined by NMS 130/300 include appropriate steps to resolve the issue, which customers may be asked to take or that NMS 130/300 may perform automatically. Hence, the remedial or corrective actions demand high accuracy with reduced false positives. SLE data is collected, processed and stored as entity events for later troubleshooting and further analysis. This process is done offline by running an event generation job, e.g., in Spark. Since this is an offline process, NMS 130/300 can leverage historical data to better analyze and fine tune the process of generating these events.

For peer-path down analysis, as summarized by data flow 450 of FIG. 5, NMS 130/300 leverages peer-path down SLE data 452 to process and aggregate further into entity events 456 via event generation 454, which may include feature extraction, cross batch analysis, and severity scoring processes. NMS 130/300 may use SLE data 452, rather than raw oc-stats data, for several reasons. Firstly, SLE data 452 is often filtered data hence it helps to reduce false positives, and secondly SLE data 452 may help to provide a unified experience in the user interface where customer may be able verify the issue across an Alert page to a SLE page to an Insight page.

As a first example of source data, cv-sle-wan-link-health, SLE detection data 452 is used as input that get funneled into the offline-processing pipeline for event generation 454. NMS 130/300 may select those SLE datapoints 452 that have network-vpn-path-down classifier detection as NMS 130/300 is interested in positive detection data points. The SLE data 452 may also include additional info like service provider details.

As a second example of source data, ssr_peer_path_last_seen, NMS 130/300 uses a separate data pipeline to determine historically how many peer-paths are active between a spoke and a hub and between respective network interfaces to determine the level of impact. Hence, NMS 130/300 regularly stores and maintains last-seen peer-paths across the management universe of NMS 130/300.

As a third example of source data, service provider_health_status, Service Provider scope analysis can be tricky as most of the time the number of data points used to detect provider level issues may not be sufficient enough with high confidence. Hence, NMS 130/300 might need additional validation steps that use an additional dataset to confirm the status of a service provider. If SLE data analysis and provider status both point to an issue at the provider level, NMS 130/300 detects provider level scope with higher confidence. A separate pipeline may be included that uses a third-party interface to retrieve status for a service provider at a particular location.

For remedial or corrective action generation, NMS 130/300 leverages the generated entity events 456 to process and aggregate further into alerts 460 via action generation 458, which may include data enrichment, cross batch aggregation, and alert generation processes. the following are example, high-level steps to determine the scope of peer-path down and action generation. NMS 130/300 takes the top-down approach in determining the scope of peer-path down. Hence, NMS 130/300 first does scope analysis at the provider level. As mentioned earlier, NMS 130/300 may analyze the extent of the issue (same provider across multiple gateways and across multiple organizations) as well as the time period. The higher the extent and smaller the time period, the higher the probability of a provider issue.

In the example where the service provider status fetching pipeline is included, NMS 130/300 may look at the statuses of all the providers that have multiple paths down across different organizations to see if the providers are having network issues or outages for the same time when paths were detected as down. If there is an outage around that time, then that is a good indication that the issue is higher up at the service provider level.

If the scope is not provider level, NMS 130/300 aggregates peer-down SLE classifier data 452 across different groups/scopes (source-gateway, hub-gateway, source-interface, hub-interface, peer-path) based on each how many peer-paths are down within a group. NMS 130/300 uses the total path count (coming from an historical dataset) and the path-down count (coming from SLE data 452) across each group/scope along with the time interval of the issue to come up with a score for each group and select the highest score to determine the scope of the path down issue. NMS 130/300 may exclude all higher-level scopes with only one peer-path, because having just one path down may not be a right indicator if the interface or gateway is having an issue.

Since with the remedial or corrective alerts NMS 130/300 may be expecting the customer to take some action, the generated alert needs to be of higher accuracy. Hence, when NMS 130/300 generates gateway or interface scope alerts, NMS 130/300 validates with additional data to confirm if indeed gateway or gateway interface is having the issue. NMS 130/300 further validates the scope to generate the alert. As one example, of gateway scope validation, NMS 130/300 looks at oc-stats dataset to detect any miss in the stats for the gateway in question. If stats are missing, then that is a good indication that the gateway is not sending stats and is having some issue. As another example of gateway interface scope validation, NMS 130/300 again looks at oc-stats dataset but instead this time look at rxbytes and txbytes for the interface. If the bytes are 0, then this is a good indication that the interface is not seeing any traffic and there is a good chance the interface is down.

If neither of the higher scopes is detected, NMS 130/300 looks at individual down paths to detect individual path specific scenarios that need customer attention. A first path-level detection is referred to as "Extended and Consistent Path-Down." In this case, if the duration of the path down has exceeded the time threshold (e.g., 24 hours), NMS 130/300 detects "extended_vpn_path_down" scope: event ['duration']>EXTENDED_PATH_DOWN_PERIOD_THRESHOLD_IN_SECS(24 hrs). A second path-level detection is referred to as "Path Flapping." In this case, if there are multiple occurrences of the same path down classifier with a same batch (between the start and end time of the job run), that means the path is flip flopping between up and down statuses: event['occurrence']>=PATH_FLIP_FLOP_OCCURRENCES_THRESHOLD(5).

Figure 6:
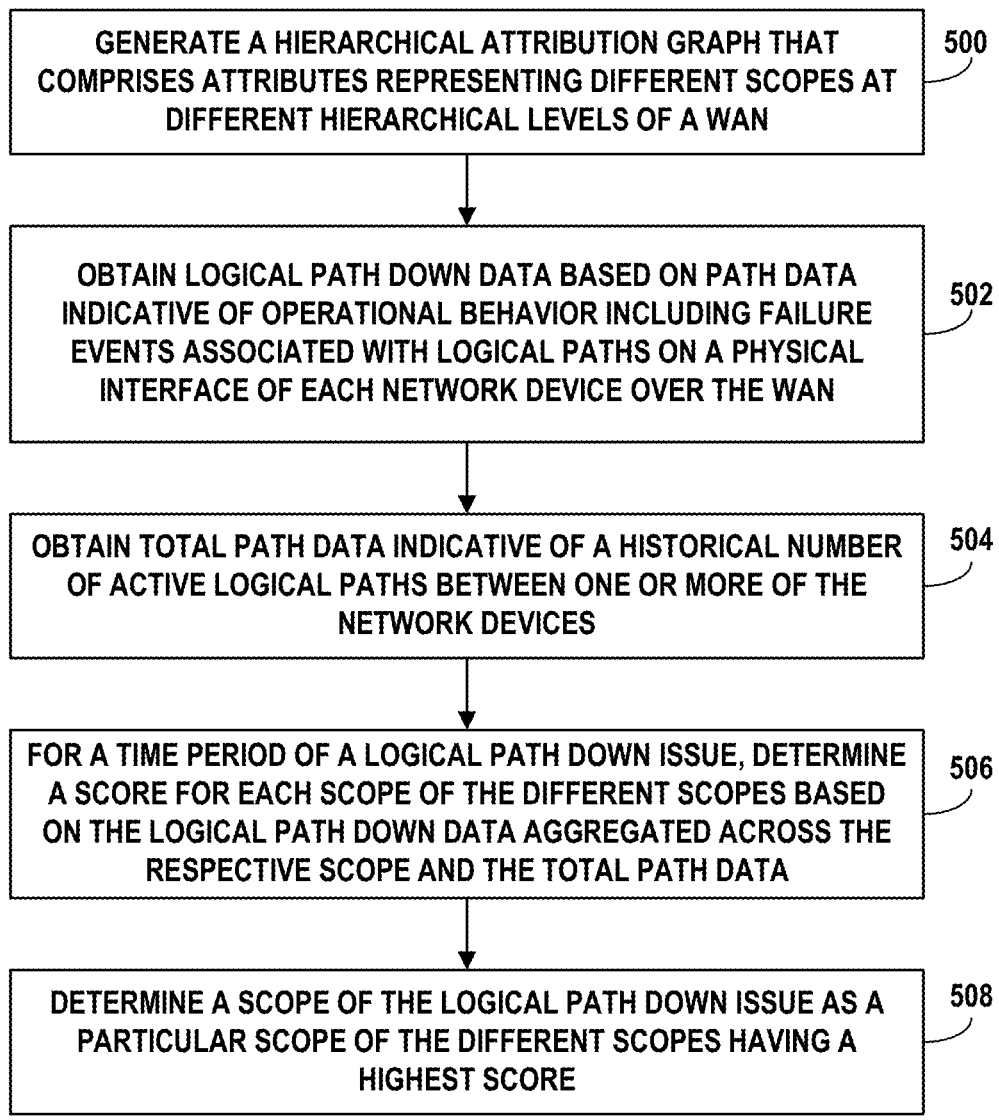
FIG. 6 is a flow chart illustrating an example operation of performing a logical path down scope analysis to identify a root cause of logical path failures in a WAN, in accordance with one or more techniques of the disclosure.

FIG. 6 is a flow chart illustrating an example operation of performing a logical path down scope analysis to identify a root cause of logical path failures in a WAN, in accordance with one or more techniques of the disclosure. The example operation of FIG. 6 is described herein with respect to NMS 300 of FIG. 3A and, more particularly, with respect to WAN scope failure detection engine 354 of FIGS. 3A-3B. In other examples, the operation of FIG. 6 may be performed by other computing devices, e.g., NMS 130 of FIGS. 1A-1C.

NMS 300 generates a hierarchical attribution graph that comprises attributes representing different scopes at different hierarchical levels of a WAN (500). The different scopes at the different hierarchical levels of the WAN include, from a highest level scope to a lowest level scope: a provider scope, a network device scope (including gateway hub and/or gateway spoke), a network device interface scope (including gateway hub interface and/or gateway spoke interface), and a logical path scope.

NMS 300 obtains logical path down data based on path data reported by a plurality of network devices operating as network gateways, where the logical path down data is indicative of operational behavior including one or more failure events associated with one or more logical paths on a physical interface of each network device of the plurality of network devices over the WAN (502). To obtain the logical path down data, NMS 300 may be configured to determine, based on the path data, a failure state associated with logical path performance based on one or more logical path down events included in the path data received from the plurality of network devices. In some examples, NMS 300 may determine, based on the path data, one or more WAN link health assessments, wherein the one or more WAN link health assessments include a logical path down SLE metric, and wherein the logical path down data comprises logical path down SLE data. NMS 300 also obtains total path data indicative of a historical number of active logical paths between one or more of the network devices (504).

NMS 300 determines a scope of a logical path down issue. First, for a time period of the logical path down issue, NMS 300 determine a score for each scope of the different scopes based on the logical path down data aggregated across the respective scope and the total path data (506). Second, NMS 300 determine the scope of the logical path down issue as a particular scope of the different scopes having a highest score (508). The particular scope having the highest score of the different scopes in the hierarchical attribution graph is comprises a scope at a highest hierarchical level of the WAN that is experiencing failure. In some examples, to determine the scope of the logical path down issue, NMS 300 may apply a machine learning model, e.g., ML model 356, to the logical path down data and the total path data for each scope of the different scopes.

NMS 300 may further identify the particular scope as a root cause of the logical path down issue based on the determination that the particular scope has the highest score of the different scopes. In response to determining the scope of the logical path down issue, NMS 300 may output a notification including identification of the root cause of the logical path down issue. NMS 300 may output the notification via a user interface for display on a user interface device of an administrator. In some cases, the notification output by NMS 300 may include a recommendation to perform one or more remedial actions to address the root cause of the logical path down issue. In other cases, NMS 300 itself may invoke one or more remedial actions to address the root cause of the logical path down issue.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A network management system comprising:
one or more processors; and
memory comprising instructions that when executed by the one or more processors cause the one or more processors to:
generate a hierarchical attribution graph, wherein the hierarchical attribution graph comprises attributes representing different scopes at different hierarchical levels of a wide area network (WAN), wherein the different scopes at the different hierarchical levels of the WAN include, from a highest level scope to a lowest level scope: a provider scope, a network gateway scope, a network gateway interface scope, and a logical path scope;
obtain logical path down data based on path data reported by a plurality of network gateways, wherein the path data of a first network gateway of the plurality of network gateways is associated with one or more logical paths of a physical interface of the first network gateway with one or more other network gateways over the WAN, and wherein the logical path down data of the first network gateway is indicative of operational behavior including one or more failure events associated with the one or more logical paths;
obtain total path data indicative of a historical number of active logical paths between the plurality of network gateways over the WAN; and
determine a scope of a logical path down issue, wherein to determine the scope of the logical path down issue, the one or more processors are configured to:
for a time period of the logical path down issue, determine a score for each scope of the different scopes based on the logical path down data aggregated across the respective scope and the total path data, and
determine the scope of the logical path down issue as a particular scope of the different scopes having a highest score.

2. The network management system of claim 1, wherein to determine the scope of the logical path down issue, the one or more processors are further configured to apply a machine learning model to the logical path down data and the total path data for each scope of the different scopes.

3. The network management system of claim 1, wherein the particular scope having the highest score of the different scopes in the hierarchical attribution graph comprises a scope at a highest hierarchical level of the WAN that is experiencing failure.

4. The network management system of claim 1, wherein the one or more processors are further configured to identify the particular scope as a root cause of the logical path down issue based on the determination that the particular scope has the highest score of the different scopes.

5. The network management system of claim 1, wherein the one or more processors are further configured to determine, based on the path data, one or more WAN link health assessments, wherein the one or more WAN link health assessments include a logical path down service level expectation (SLE) metric, and wherein the logical path down data comprises logical path down SLE data.

6. The network management system of claim 1, wherein to obtain the logical path down data, the one or more processors are configured to determine, based on the path data, a failure state associated with logical path performance based on one or more logical path down events included in the path data received from the plurality of network gateways.

7. The network management system of claim 1, wherein the one or more processors are configured to, in response to determining the scope of the logical path down issue, output a notification including identification of a root cause of the logical path down issue.

8. The network management system of claim 7, wherein the notification includes a recommendation to perform one or more remedial actions to address the root cause of the logical path down issue.

9. The network management system of claim 7, wherein the one or more processors are configured to invoke one or more remedial actions to address the root cause of the logical path down issue.

10. The network management system of claim 7, wherein to output the notification, the one or more processors are configured to output the notification via a user interface for display on a user interface device of an administrator.

11. A method comprising:
generating, by a network management system (NMS), a hierarchical attribution graph, wherein the hierarchical attribution graph comprises attributes representing different scopes at different hierarchical levels of a wide area network (WAN), wherein the different scopes at the different hierarchical levels of the WAN include, from a highest level scope to a lowest level scope: a provider scope, a network gateway scope, a network gateway interface scope, and a logical path scope;
obtaining, by the NMS, logical path down data based on path data reported by a plurality of network gateways, wherein the path data of a first network gateway of the plurality of network gateways is associated with one or more logical paths of a physical interface of the first network gateway with one or more other network gateways over the WAN, and wherein the logical path down data of the first network gateway is indicative of operational behavior including one or more failure events associated with the one or more logical paths;
obtaining, by the NMS, total path data indicative of a historical number of active logical paths between the plurality of network gateways over the WAN; and
determining, by the NMS, a scope of a logical path down issue, wherein determining the scope of the logical path down issue comprises:
for a time period of the logical path down issue, determining a score for each scope of the different scopes based on the logical path down data aggregated across the respective scope and the total path data, and determining the scope of the logical path down issue as a particular scope of the different scopes having a highest score.

12. The method of claim 11, wherein determining the scope of the logical path down issue comprises applying a machine learning model to the logical path down data and the total path data for each scope of the different scopes.

13. The method of claim 11, further comprising identifying the particular scope as a root cause of the logical path down issue based on the determination that the particular scope has the highest score of the different scopes.

14. The method of claim 11, further comprising determining, based on the path data, one or more WAN link health assessments, wherein the one or more WAN link health assessments include a logical path down service level expectation (SLE) metric, and wherein the logical path down data comprises logical path down SLE data.

15. The method of claim 11, wherein obtaining the logical path down data comprises determining, based on the path data, a failure state associated with logical path performance based on one or more logical path down events included in the path data received from the plurality of network gateways.

16. The method of claim 11, further comprising, in response to determining the scope of the logical path down issue, outputting a notification including identification of a root cause of the logical path down issue.

17. The method of claim 16, wherein the notification includes a recommendation to perform one or more remedial actions to address the root cause of the logical path down issue.

18. The method of claim 16, further comprising invoking one or more remedial actions to address the root cause of the logical path down issue.

19. Computer-readable storage media comprising instructions that, when executed, cause one or more processors to:

generate a hierarchical attribution graph, wherein the hierarchical attribution graph comprises attributes representing different scopes at different hierarchical levels of a wide area network (WAN), wherein the different scopes at the different hierarchical levels of the WAN include, from a highest level scope to a lowest level scope: a provider scope, a network gateway scope, a network gateway interface scope, and a logical path scope;

obtain logical path down data based on path data reported by a plurality of network gateways, wherein the path data of a first network gateway of the plurality of network gateways is associated with one or more logical paths of a physical interface of the first network gateway with one or more other network gateways over the WAN, and wherein the logical path down data is indicative of operational behavior including one or more failure events associated with the one or more logical paths;

obtain total path data indicative of a historical number of active logical paths between the plurality of network gateways over the WAN; and determine a scope of a logical path down issue, wherein to determine the scope of the logical path down issue, the instructions cause the one or more processors to:

for a time period of the logical path down issue, determine a score for each scope of the different scopes based on the logical path down data aggregated across the respective scope and the total path data, and determine the scope of the logical path down issue as a particular scope of the different scopes having a highest score.

* * * * *